US011485030B2

(12) United States Patent
Bechini et al.

(10) Patent No.: US 11,485,030 B2
(45) Date of Patent: Nov. 1, 2022

(54) CONSTRUCTIVE ASSEMBLY OF A CONTAINMENT MEANS, INTENDED FOR THE AUTOMATED PRODUCTION OF PHARMACEUTICAL OR BIOTECHNICAL ARTICLES

(71) Applicant: Pharma Integration S.R.L., Siena (IT)

(72) Inventors: Claudio Bechini, Siena (IT); Volker Sigwarth, Sisseln (CH)

(73) Assignee: Pharma Integration S.R.L., Siena (IT)

(*) Notice: Subject to any disclaimer, the term of this patent is extended or adjusted under 35 U.S.C. 154(b) by 739 days.

(21) Appl. No.: 16/470,447

(22) PCT Filed: Dec. 15, 2017

(86) PCT No.: PCT/IB2017/001581
§ 371 (c)(1),
(2) Date: Jun. 17, 2019

(87) PCT Pub. No.: WO2018/109549
PCT Pub. Date: Jun. 21, 2018

(65) Prior Publication Data
US 2019/0315004 A1 Oct. 17, 2019

(30) Foreign Application Priority Data
Dec. 15, 2016 (EP) ..................... 16405035

(51) Int. Cl.
*B25J 21/00* (2006.01)
*B25J 9/00* (2006.01)
(Continued)

(52) U.S. Cl.
CPC ........... *B25J 21/005* (2013.01); *B08B 15/023* (2013.01); *B25J 9/0084* (2013.01); *B65B 3/003* (2013.01);
(Continued)

(58) Field of Classification Search
CPC ..... B65B 3/003; B65B 7/2807; B65B 7/2821; B65B 43/46; B65B 43/54; B65B 55/027;
(Continued)

(56) References Cited

U.S. PATENT DOCUMENTS 9,561,156 B2 * 2/2017 Koike et al. ........... B25J 11/009
2006/0136095 A1 6/2006 Rob et al.
(Continued)

OTHER PUBLICATIONS

International Search Report of the International Searching Authority dated Mar. 16, 2018, along with an English translation, issued in connection with International Application No. PCT/IB2017/001581 (7 pages).
(Continued)

*Primary Examiner* — Stephen F. Gerrity
(74) *Attorney, Agent, or Firm* — McCarter & English, LLP

(57) ABSTRACT

A containment system and assembly for the automated production of pharmaceutical or biotechnical articles is provided. The containment system has a housing within which there is an inner chamber having at least one through opening. One or more robots are installed in the chamber, which have a manipulating element on the pivotable arms, which can move within a pivot range. One or more process units are installed in the chamber for the production of the articles. The chamber includes a process space for the production of the articles and a tub-shaped base space for anchoring the feet of the robots to the side surfaces inside the base space. The manipulating element functions as a gripping and transportation device for inspecting the articles or article parts and/or for the production of the articles.

21 Claims, 18 Drawing Sheets

Figure 1A:
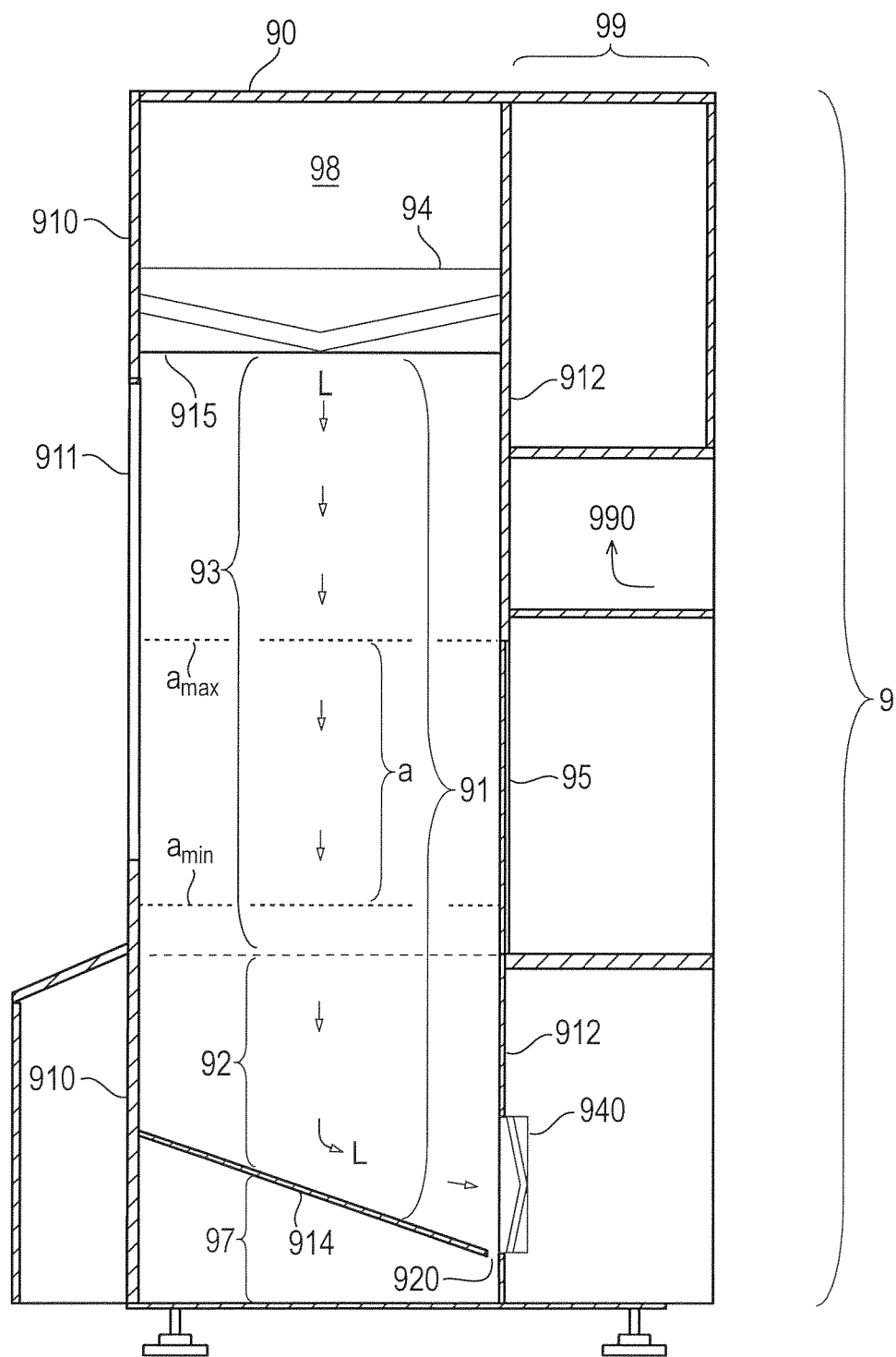

(51) Int. Cl.
*B65B 3/00* (2006.01)
*B65B 7/28* (2006.01)
*B65B 43/46* (2006.01)
*B65B 55/02* (2006.01)
*B65B 55/04* (2006.01)
*B65B 57/00* (2006.01)
*B08B 15/02* (2006.01)
*B65B 43/54* (2006.01)

(52) U.S. Cl.
CPC .......... *B65B 7/2807* (2013.01); *B65B 7/2821* (2013.01); *B65B 43/46* (2013.01); *B65B 43/54* (2013.01); *B65B 55/027* (2013.01); *B65B 55/04* (2013.01); *B65B 57/00* (2013.01)

(58) Field of Classification Search
CPC ........ B65B 55/04; B65B 57/00; B25J 21/005; B25J 9/0084; B08B 15/023
See application file for complete search history.

(56) References Cited

U.S. PATENT DOCUMENTS

| | | | |
|---|---|---|---|
| 2010/0198392 A1* | 8/2010 | Eliuk et al. | B65B 3/003 700/216 |
| 2011/0067781 A1* | 3/2011 | Osborne | B65B 3/003 141/37 |
| 2012/0191243 A1 | 7/2012 | Haas et al. | |
| 2014/0150379 A1* | 6/2014 | Aguerre et al. | B65B 3/003 53/473 |
| 2014/0277713 A1* | 9/2014 | Kouno et al. | B25J 9/0084 700/248 |
| 2014/0277714 A1* | 9/2014 | Izumi et al. | B25J 9/0084 700/248 |
| 2014/0277715 A1* | 9/2014 | Nagai et al. | B25J 9/0084 700/254 |
| 2015/0335531 A1* | 11/2015 | Yuyama et al. | B25J 9/0084 141/18 |
| 2016/0136052 A1 | 5/2016 | Koike et al. | |
| 2016/0288340 A1* | 10/2016 | Akaha et al. | B25J 21/00 |
| 2016/0326573 A1 | 11/2016 | Spence et al. | |
| 2018/0162572 A1* | 6/2018 | Trilli et al. | B65B 3/003 |
| 2018/0339796 A1* | 11/2018 | Bai et al. | B65B 3/003 |

OTHER PUBLICATIONS

Written Opinion of the International Searching Authority dated Mar. 16, 2018, issued in connection with International Application No. PCT/IB2017/001581 (6 pages).

* cited by examiner

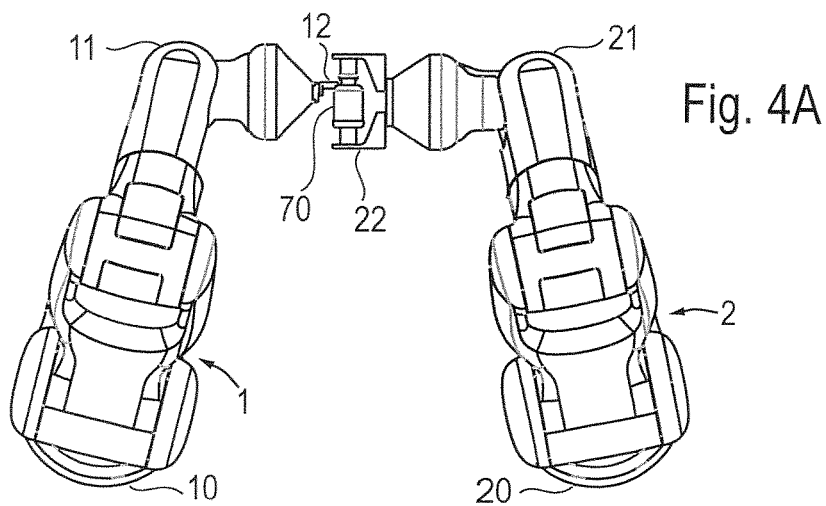
Fig. 4A
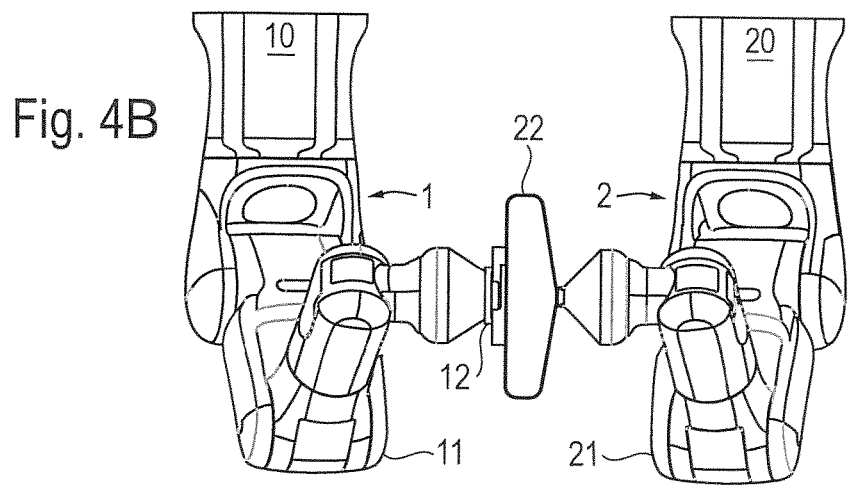
Fig. 4B
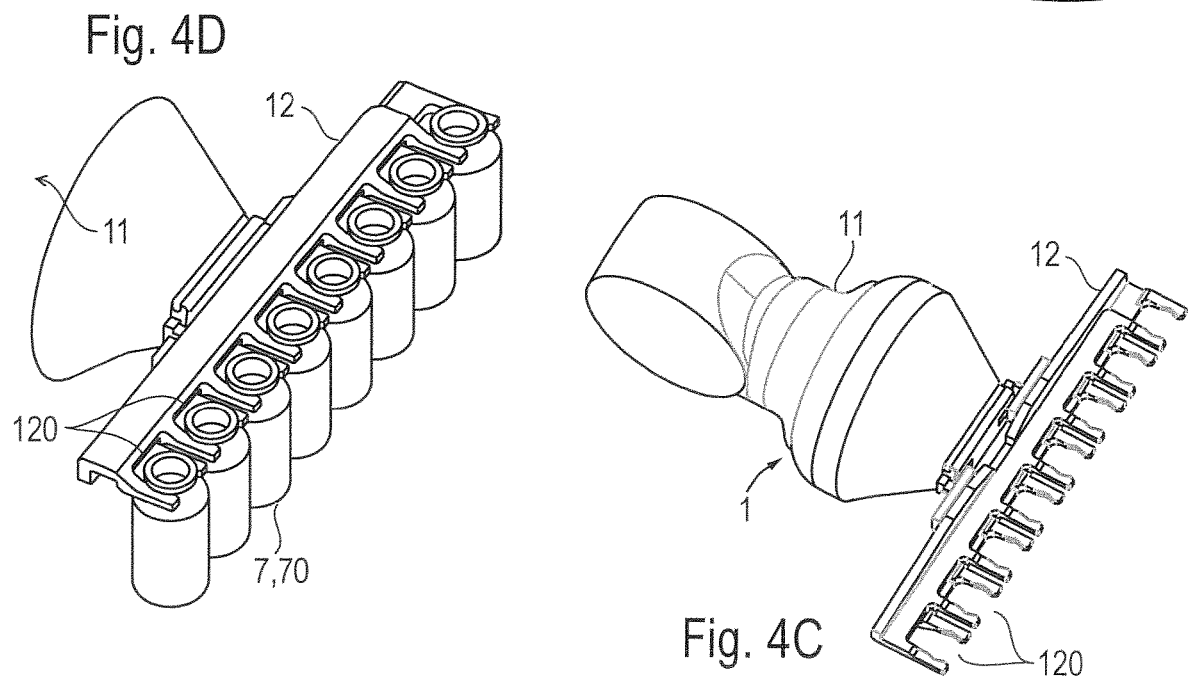
Fig. 4D
Fig. 4C

CONSTRUCTIVE ASSEMBLY OF A CONTAINMENT MEANS, INTENDED FOR THE AUTOMATED PRODUCTION OF PHARMACEUTICAL OR BIOTECHNICAL ARTICLES

RELATED APPLICATIONS

This application is a U.S. National Phase Application under 35 U.S.C. 371 of International Application No. PCT/IB2017/001581 filed Dec. 15, 2017, which claims the benefit of European Patent Application No. 16405035.3 filed on Dec. 15, 2016. The disclosures of these applications are incorporated herein by reference in their entireties.

FIELD OF USE OF THE INVENTION

The invention relates to the constructive assembly of a containment means intended for the automated production of pharmaceutical or biotechnical articles which, as an end product, in each case comprise a plurality of article parts. The containment means is typically configured as an open or closed restricted access barrier system (RABS) or as an isolator, in each case equipped with an air treatment device and having a clean-room classification. The containment means is surrounded by a housing within which there is an inner chamber with at least one through-opening. Further generic features of the assembly are that at least one robot is installed in the chamber, said robot having, on its pivotable arm, at least one manipulating element which is movable within a pivot range, wherein the chamber is suitable for installation of at least one process unit for the production of the articles. Several such containment means can be linked to each other in a production line in order to form a containment means chain.

PRIOR ART

In the previously known containment means for automated production of pharmaceutical or biotechnical articles, washing, filling and closing stations are installed in the containment means, and conveyor belts, with carousel conveyors arranged between them, extend through the containment means and deliver the article parts that are to be processed to the respective machine station. For this purpose, the following are known for example from the company Bosch: "Universal washing machines RRN/RRU", "FLC—Filling and closing machine for vials and infusion bottles", "Closing machine for overseal caps VRU/VRT/VRK", "Drying and Sterilizing Tunnel HQL Series" and "FXS—Filling and sealing machine for presterilized syringes".

OBJECT OF THE INVENTION

The object of the invention is to propose a constructive assembly of a containment means for the automated production of pharmaceutical or biotechnical articles, in the work chamber of which containment means the development of undesired particles, e.g. caused by abrasion on receptacles and/or on transport means, is reduced. At the same time, the design concept is intended to ensure that the laminar airflow guided through the work chamber is disturbed to a lesser extent by installed add-on structures. These objects have the ultimate aim of reducing the error rate of articles not treated according to regulations. Finally, it is an object of the design concept to permit modular adaptation to specific production requirements, also for interconnected chains of containment means.

OVERVIEW OF THE INVENTION

The constructive assembly of a containment means is intended for the automated production of pharmaceutical or biotechnical articles, As end product, an article in each case comprises a plurality of article parts. The containment means is surrounded by a housing within which there is an inner chamber having at least one through-opening. At least one robot is installed in the chamber, which robot has at least one manipulating element on its pivotable arm, which can move within a pivot range. The chamber is suitable for the installation of at least one process unit for production of the articles.

Further to the above list of features forming the preamble, the constructive assembly has the following features. The chamber comprises a process space for the production of the articles, and a tub-shaped base space for anchoring the foot of the at least one robot to one of the side faces inside the base space. The process space is arranged above the base space, and both adjoin each other in a congruent and open manner. The manipulating element has the functions of gripping means and transporting means for the articles or article parts and/or for inspection of the articles or article parts and/or for production of the articles. The pivot range of the at least one manipulating element on the at least one robot extends in a horizontal plane and a vertical plane within a working region, which is defined between a minimum working height and a maximum working height.

Particular embodiments of the invention are defined below. Within the pivot range, at least one transfer region is provided which is intended to pick up or position articles or article parts by means of the manipulating element of the at least one robot.

Alternatively, two transfer regions are advantageously provided within the pivot range. Here, the first transfer region is intended for picking up articles or article parts by means of the manipulating element of the at least one robot, and the second transfer region is intended for positioning articles or article parts by means of the manipulating element of the at least one robot.

A first containment means is connected to a second containment means, in each of which a robot is installed, and one of the transfer regions lies in the pivot range of the manipulating elements of both robots.

Alternatively, at least two robots are advantageously installed in the containment means, wherein a transfer region lies in each case in the pivot range of the manipulating elements of two adjacent robots.

At least one process unit for production of the articles is installed in the process space of the containment means, in the pivot range of the manipulating element of the at least one robot. The process unit is configured as a washing station, drying station, sterilizing station, filling station, closing station, assembly or disassembly station, identification station or test station. The test station is set up for optical inspection and/or weight control. A plurality of process units with various functions can be installed in the process space.

In order to form a modular system of containment means, a predefined positioning grid is provided for anchoring the foot of the at least one robot to the side faces inside the base space of the respective containment means.

The base space is delimited by an inclined bottom face which promotes the removal of an airflow, preferably of a laminar nature, flowing through the chamber and of liquids that arise in the process space during the production of the articles.

Moreover, at least one transfer station for interim positioning of article parts and/or articles and/or at least one storage means for storing article parts are arranged in the process space.

The manipulating elements have a pick-up grid for picking up a grouped number of article parts or articles. The storage means can be assigned a magazine for filling a manipulating element, according to its pick-up grid, with a grouped number of article parts. A respective pick-up grid of the process units and transfer station is configured to simultaneously handle a grouped number of article parts or articles in a manner numerically and geometrically matching the pick-up grid of the manipulating elements. The manipulating element can additionally be equipped with an assembly or disassembly device, an inspection device and/or a closing device and/or an identification device.

A replaceable exchange module, which is equipped with function-specific process units, is insertable into one of the housing faces delimiting the process space. The exchange module can have, in addition to the process units, a lock device for loading/unloading article parts or articles. Functionally identical process units can be arranged in mutually staggered cascades.

A first containment means is linked to further containment means in a production line to form a containment means chain. The respective base space and the respective process space can be equipped in a task-specific manner with robots, manipulating elements and/or process units and/or transfer stations and/or storage means. The pivot range of the at least one manipulating element on the at least one robot extends in a horizontal plane at least beyond one of the vertical faces of the process space.

Inside a containment means chain, the first containment means has a first through-opening via which article parts, in the form of receptacles placed in a tray systematically according to a sorting grid, are delivered to the process space. Thus, a grouped number of the receptacles can be gripped by the manipulating element of the first robot and brought to the first process unit in order to carry out the first production step. The first containment means has a second through-opening or is open toward an adjacent containment means for the purpose of transferring the article parts, processed thus far, into the process space of the next containment means in order to carry out subsequent production steps by means of further robots and further process units. The final containment means of the containment means chain, with the final robots and final process units installed therein, is intended for carrying out final production steps. This final containment means has a second through-opening through which the finished produced articles can be output.

The pick-up grid of the manipulating elements is designed to be adjustable by an adjustment mechanism, in order to establish compatibility if the sorting grid initially deviates from the pick-up grids of the process units and transfer station.

The finished produced article comprises as article parts:
a receptacle;
a pharmaceutical or biotechnical filling as liquid or powder introduced into the receptacle through the filling opening of the latter;
a first closure in the form of a stopper or of a thermally produced closure; and
an optional second closure in the form of an element, e.g. a crimped cap, engaging with a form fit over the first closure and serving to secure the first closure.

A process unit has the form of a weighing station which is supported on a foundation outside the chamber or directly outside the containment means and is thus insulated from shocks.

The weighing station has a weighing tray with a pick-up grid which is compatible with the other pick-up grids and which is intended:
for the insertion of a grouped number of receptacles provided with the filling and deposited by the manipulating element; and
for individual weight measurement of each one of the filled receptacles.

The storage means is provided with a vibration device for the purpose of filling the magazine and is supported outside the chamber in order to avoid interference vibrations.

A tunnel extends through the individual containment means and the containment means chain and serves to ensure that the trays emptied of receptacles at the first through-opening bypass the chamber and are made available again at the second through-opening in order to pick up the finished produced articles and, after emptying, are returned to the first through-opening.

The containment means is configured as:
an open or closed restricted access barrier system (RABS) with an air treatment device of clean-room classification; or
an isolator with an air treatment device of clean-room classification and a decontamination device.

The air treatment device has an inflow air filter, which is arranged above the process space, and an outflow air filter, which is installed in a seat present at the base space.

BRIEF DESCRIPTION OF THE ATTACHED DRAWINGS

Figure 1B:
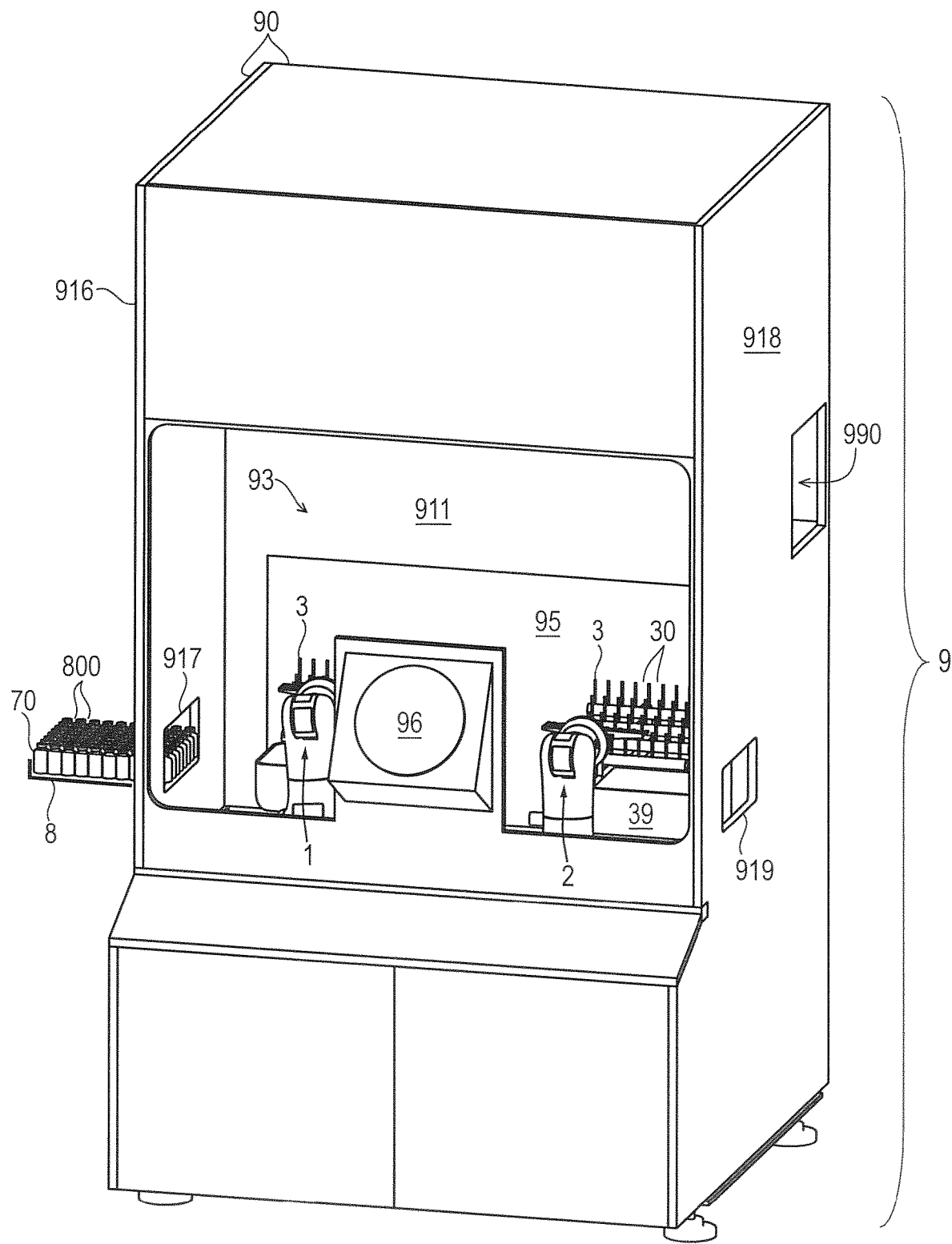
Figure 1C:
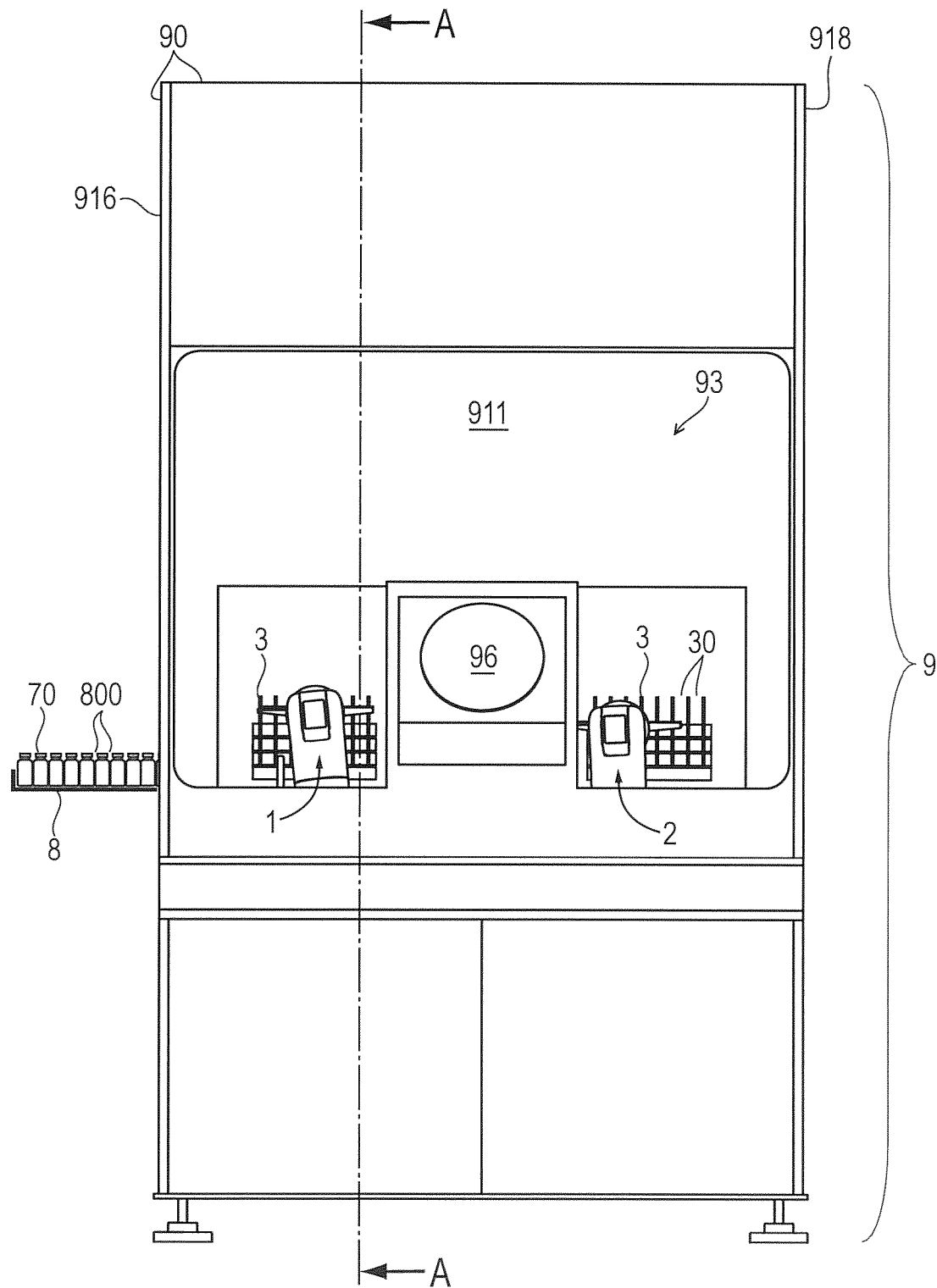
Figure 1D:
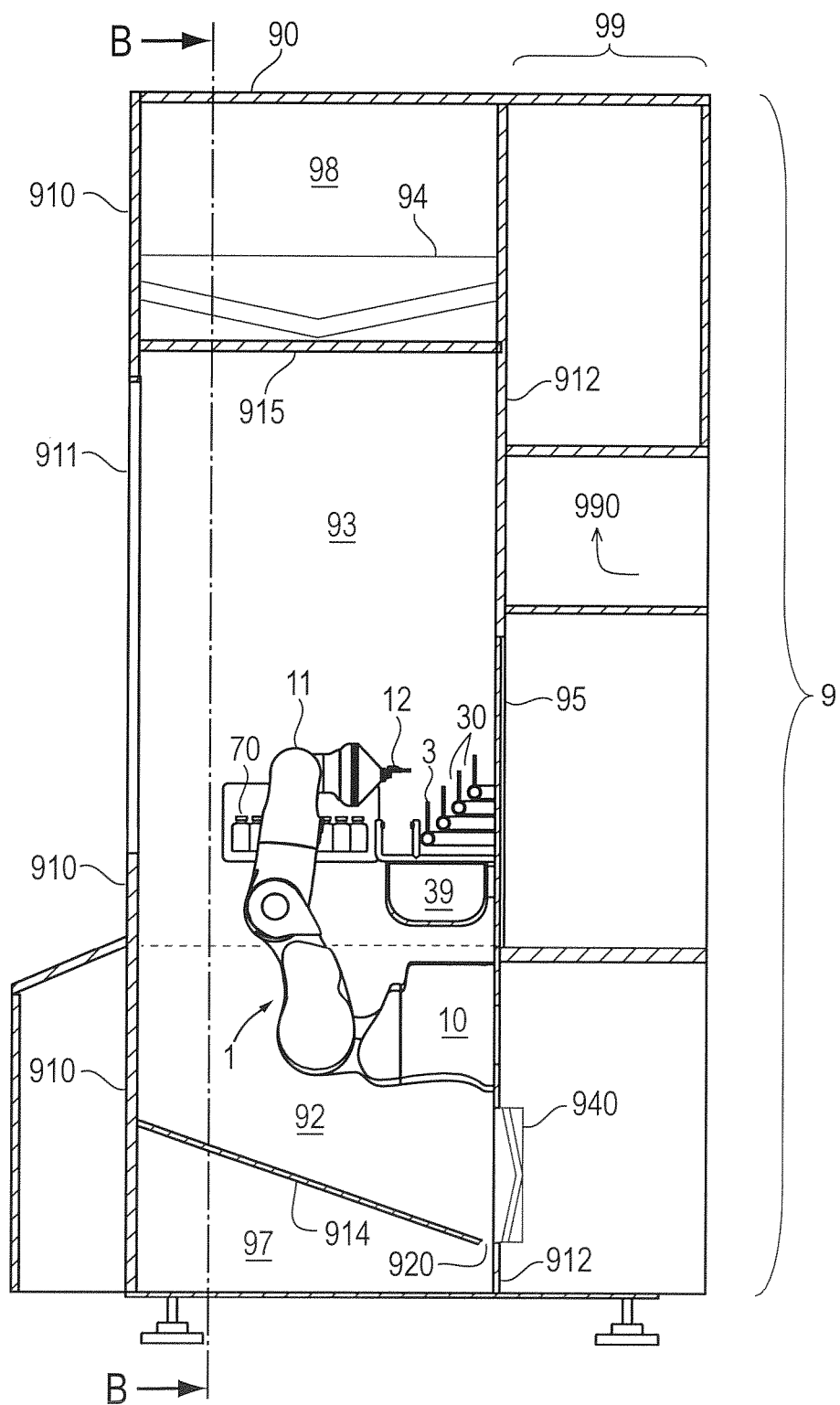
Figure 1E:
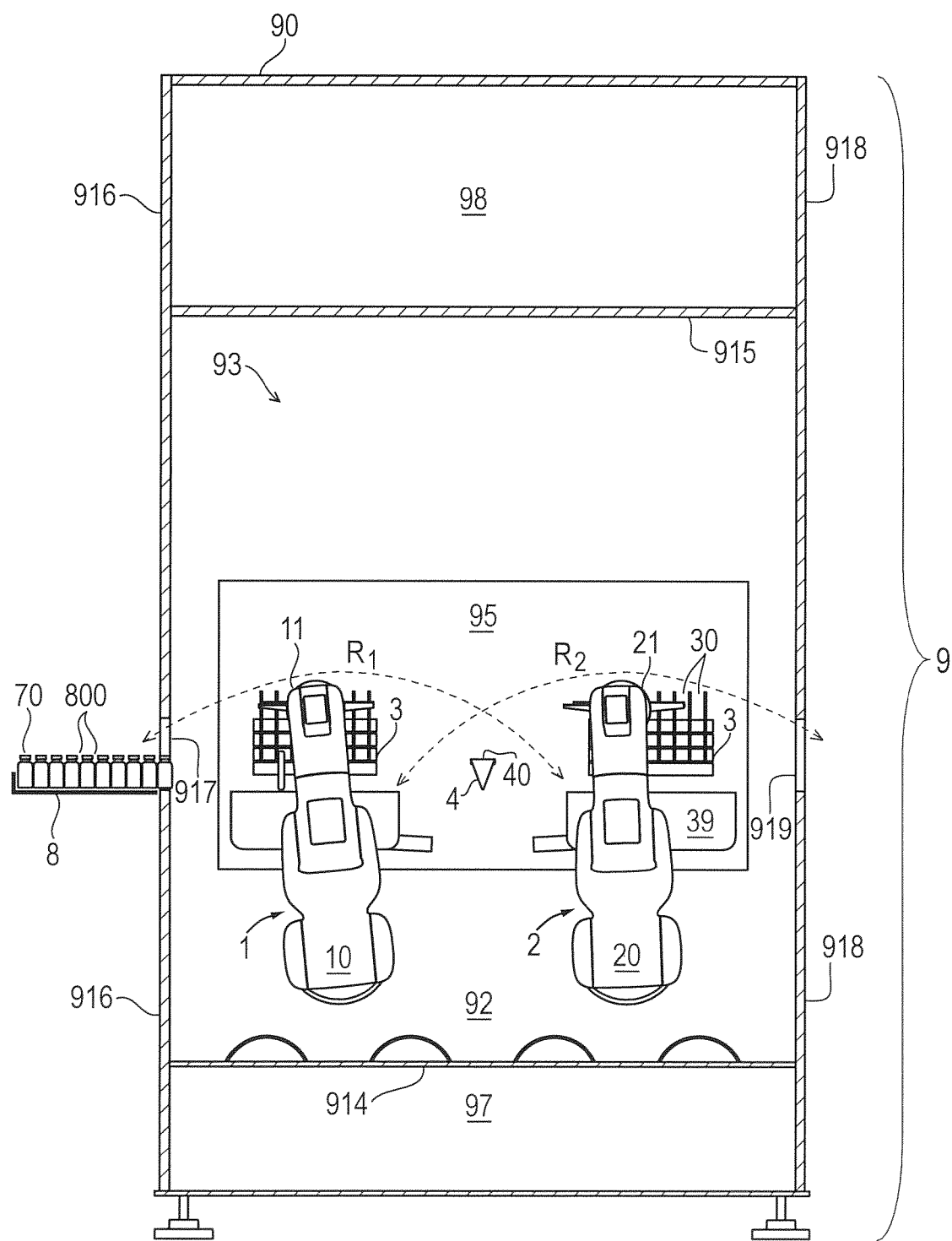
Figure 2A:
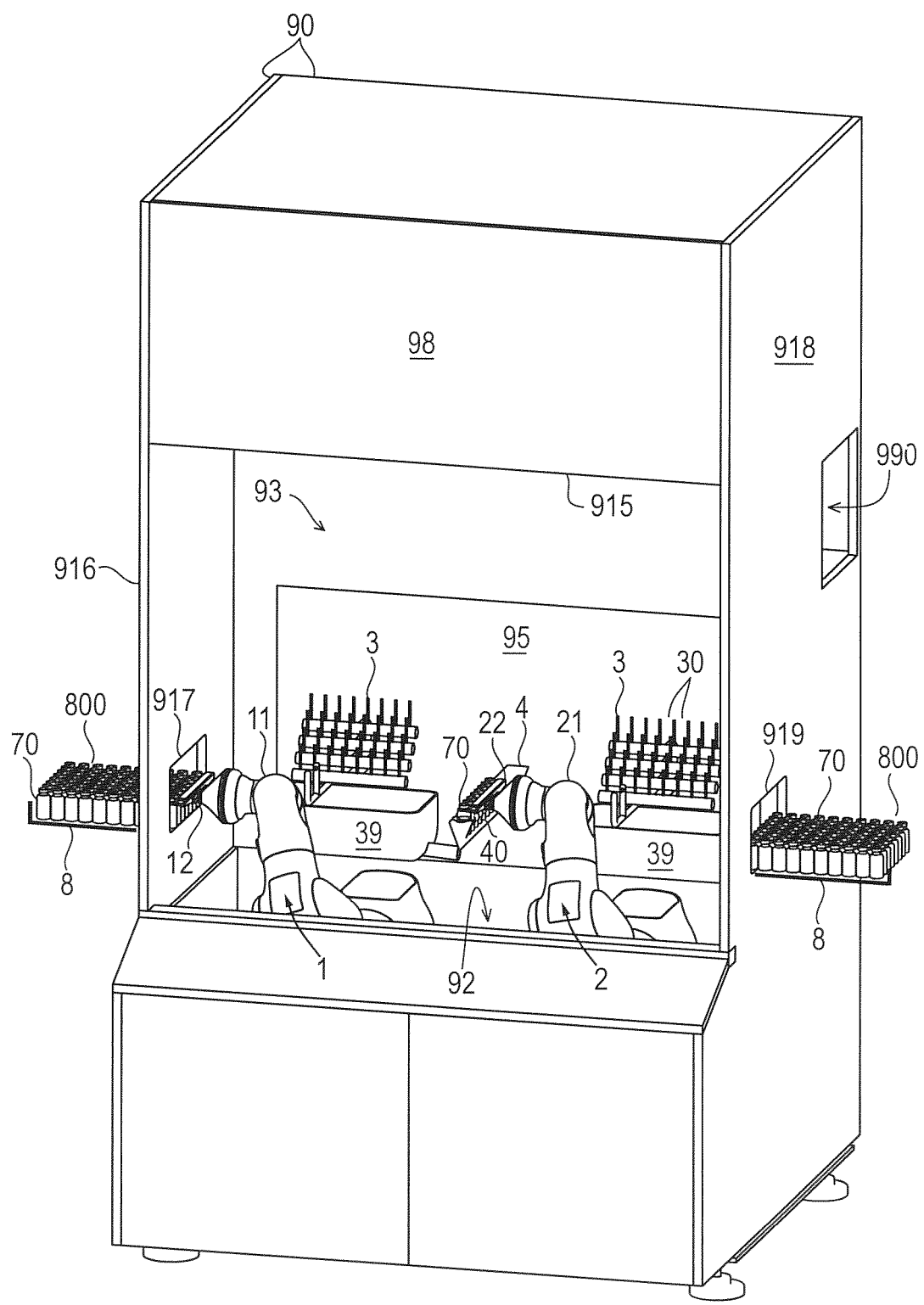
Figure 2B:
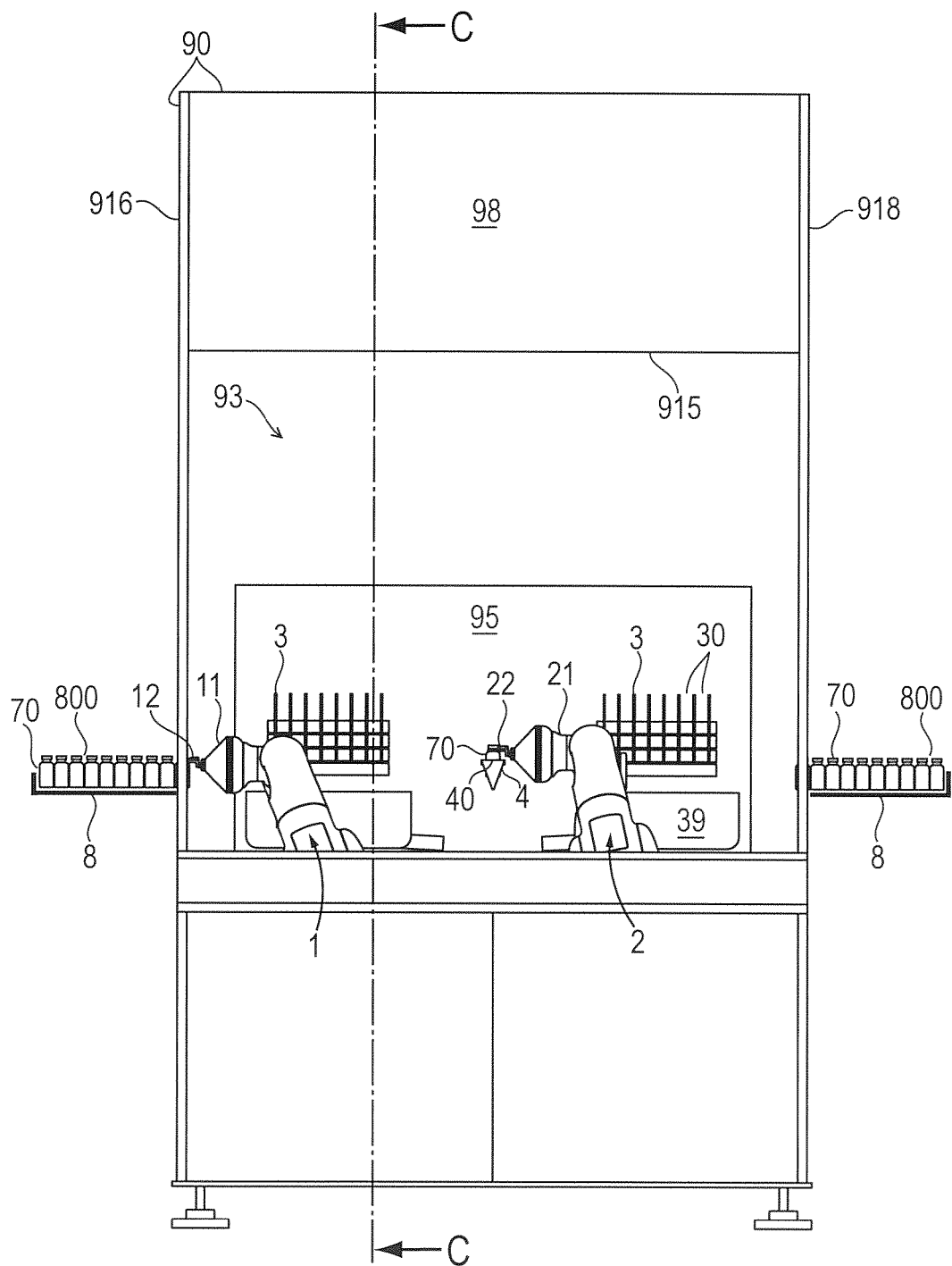
Figure 2C:
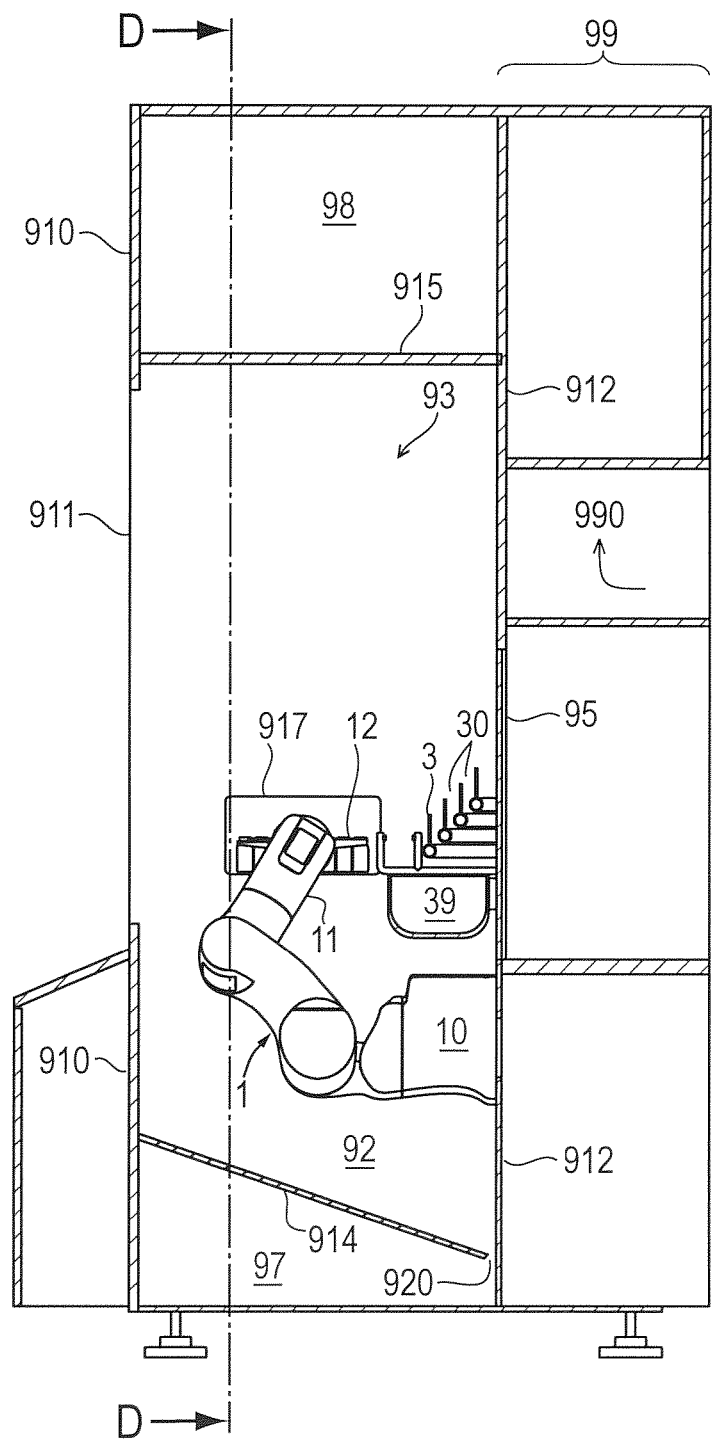
Figure 2D:
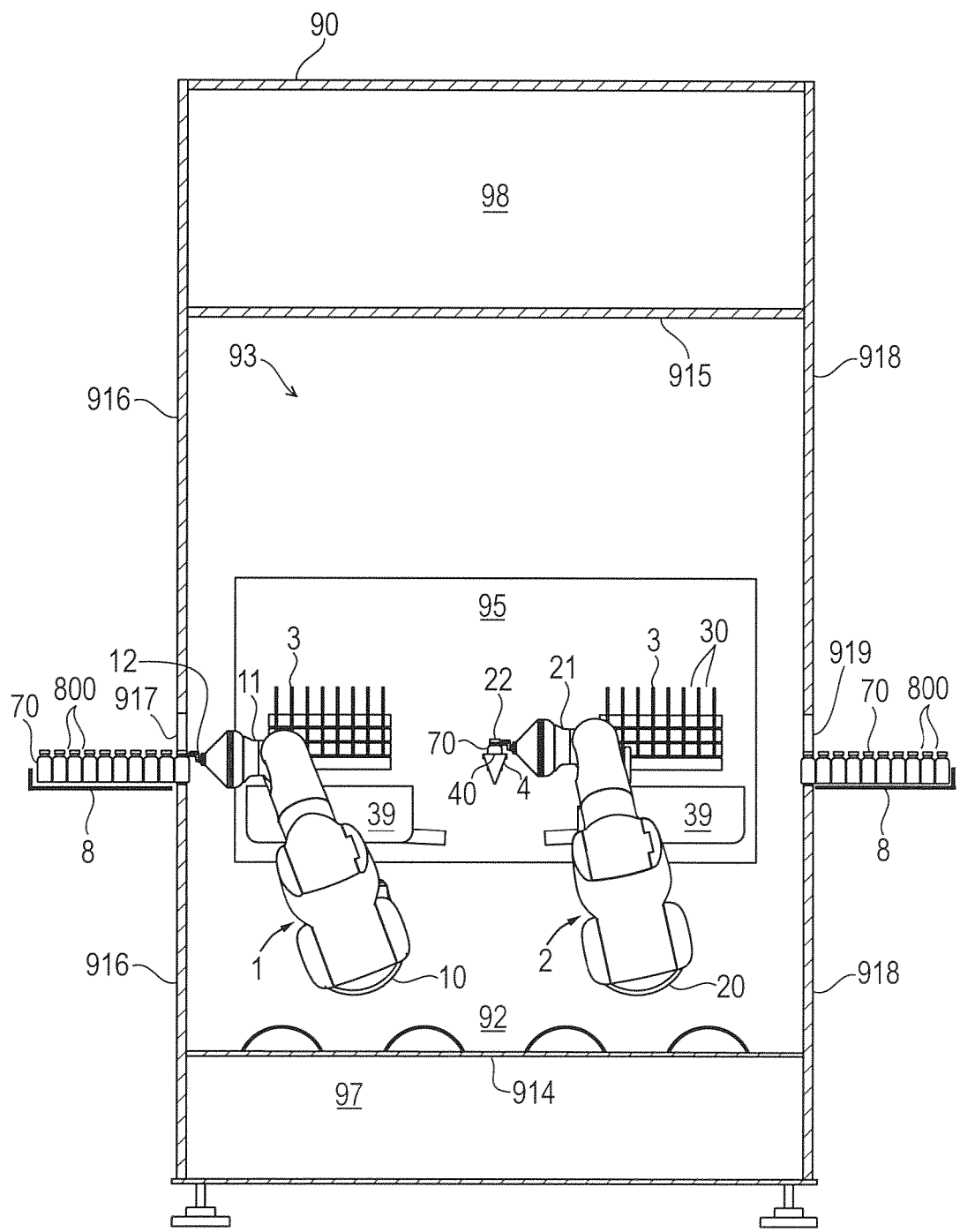
Figure 3A:
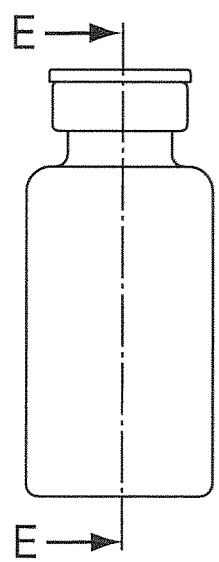
Figure 3B:
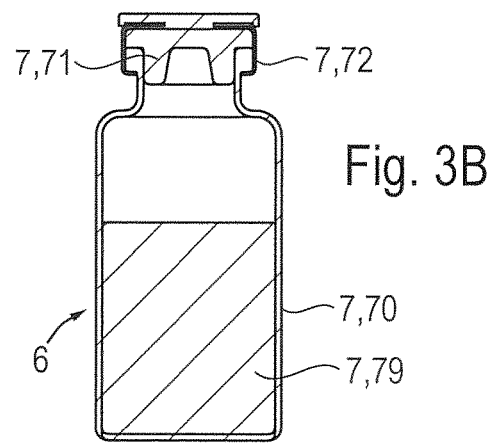
Figure 3C:
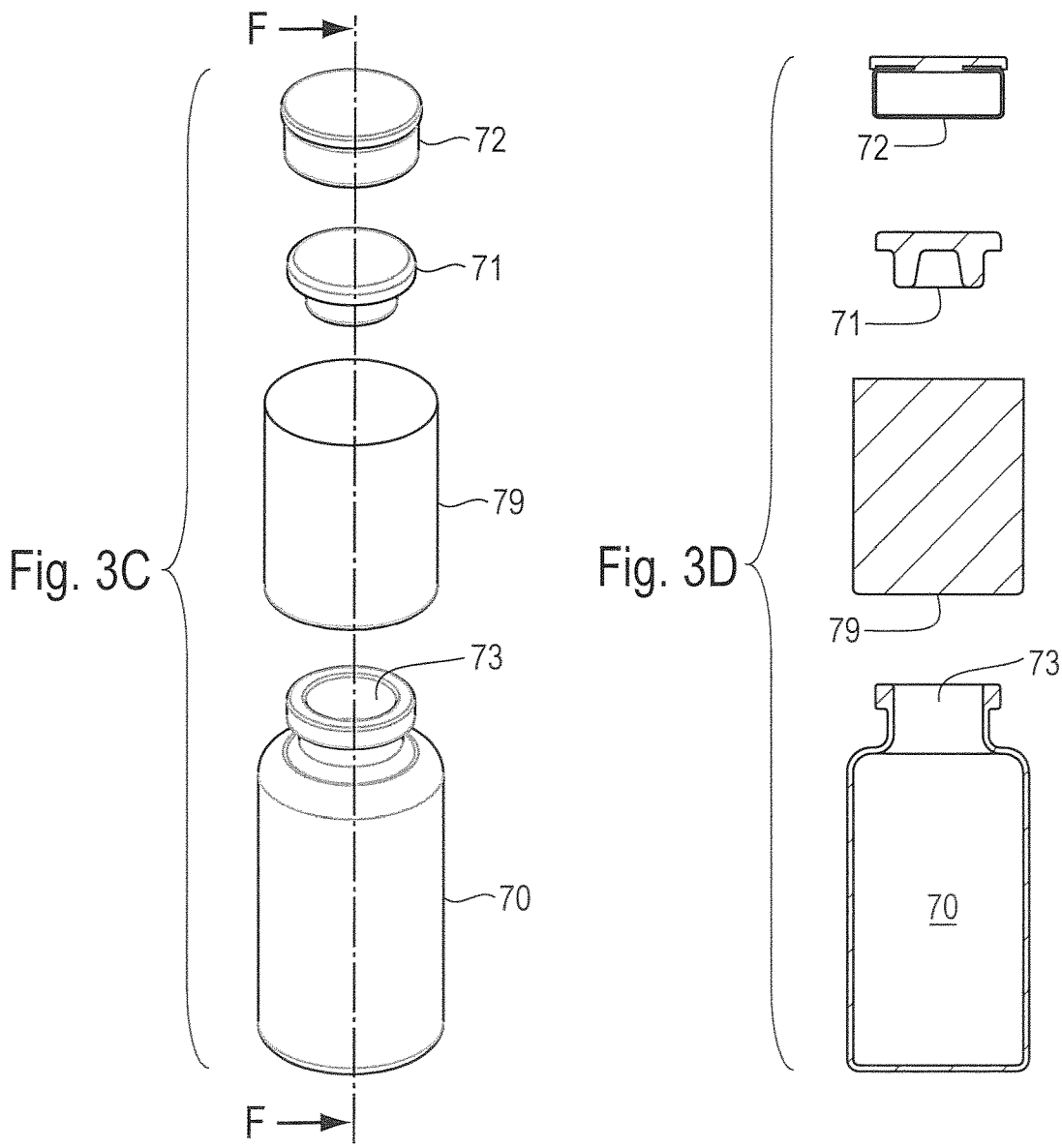
Figure 3D:
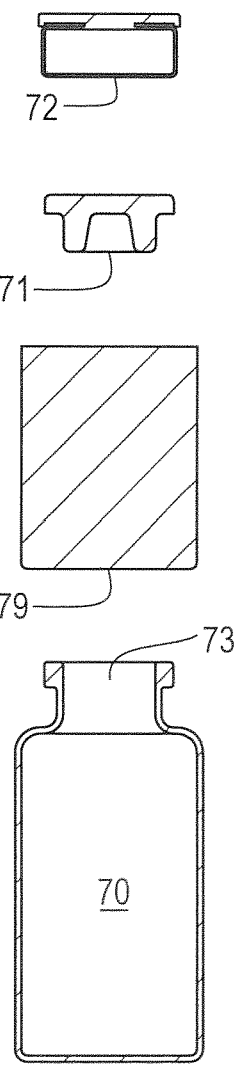
Figure 5:
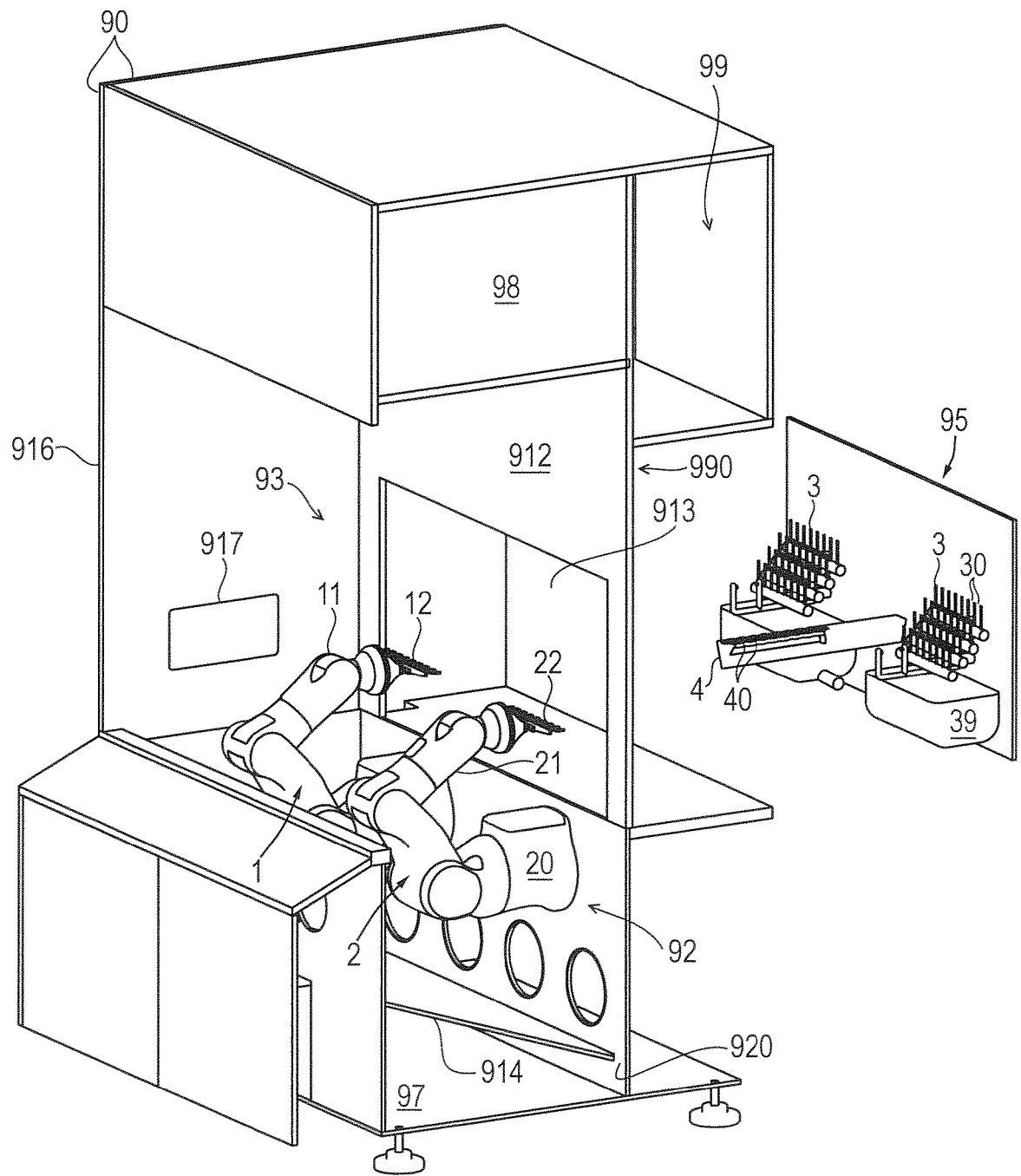
Figure 6A:
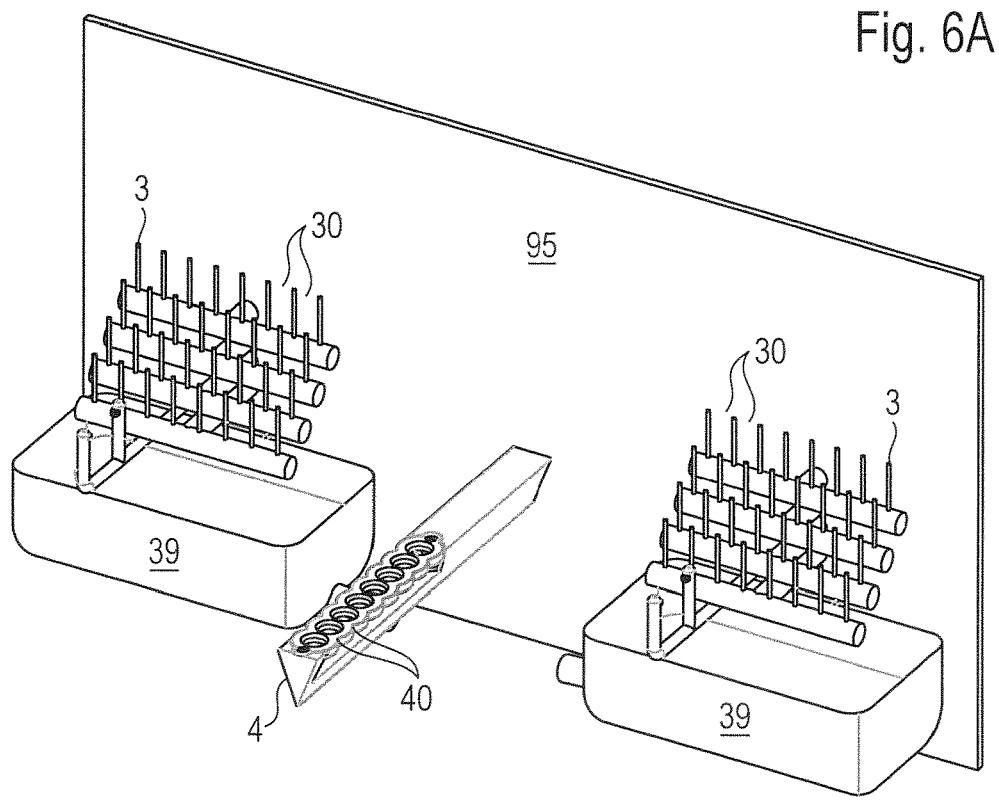
Figure 6B:
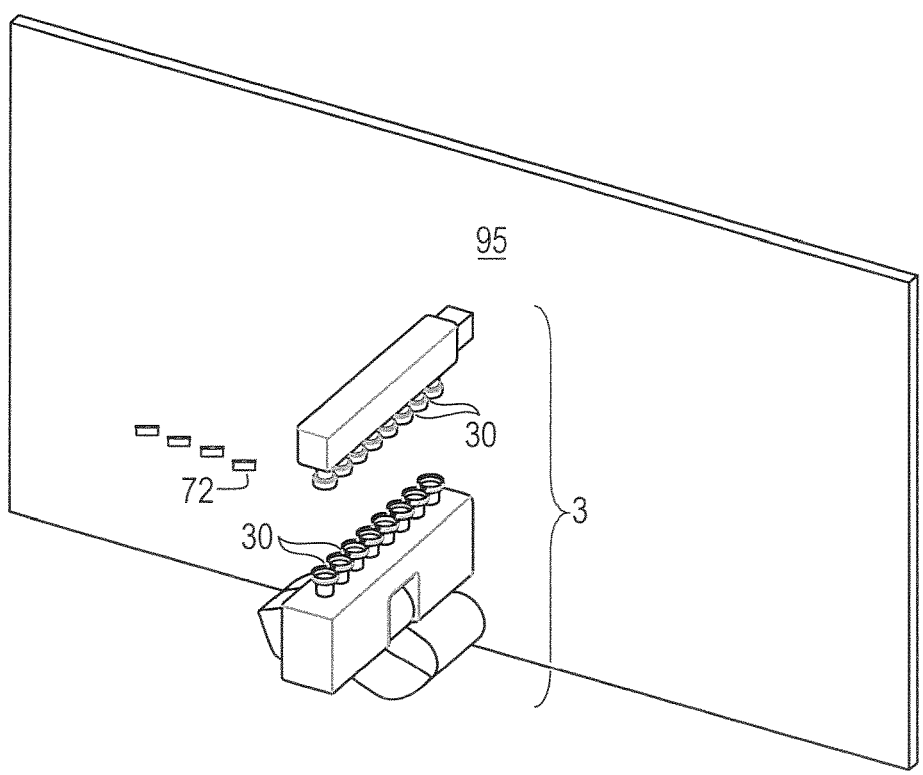
Figure 7A:
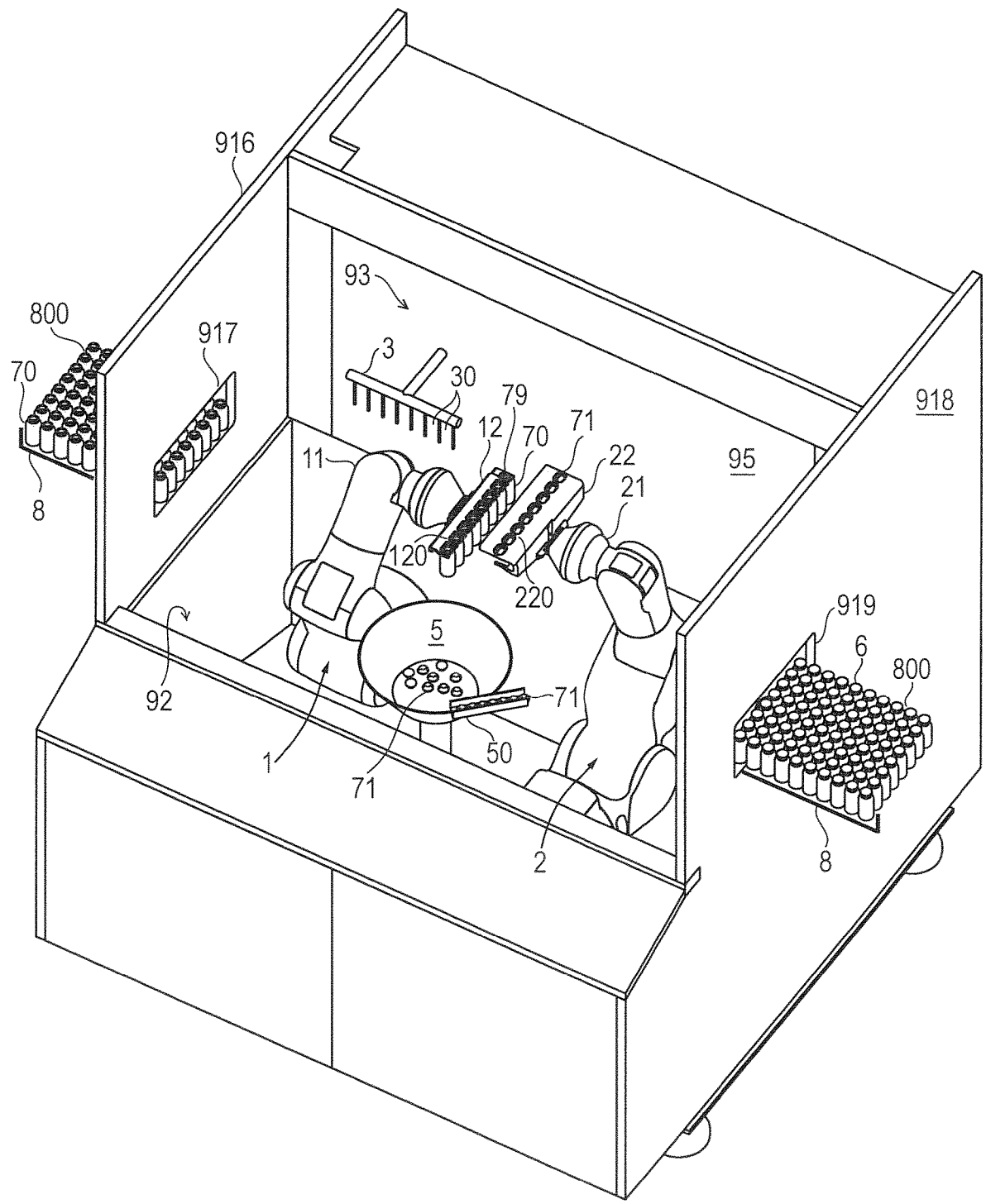
Figure 7B:
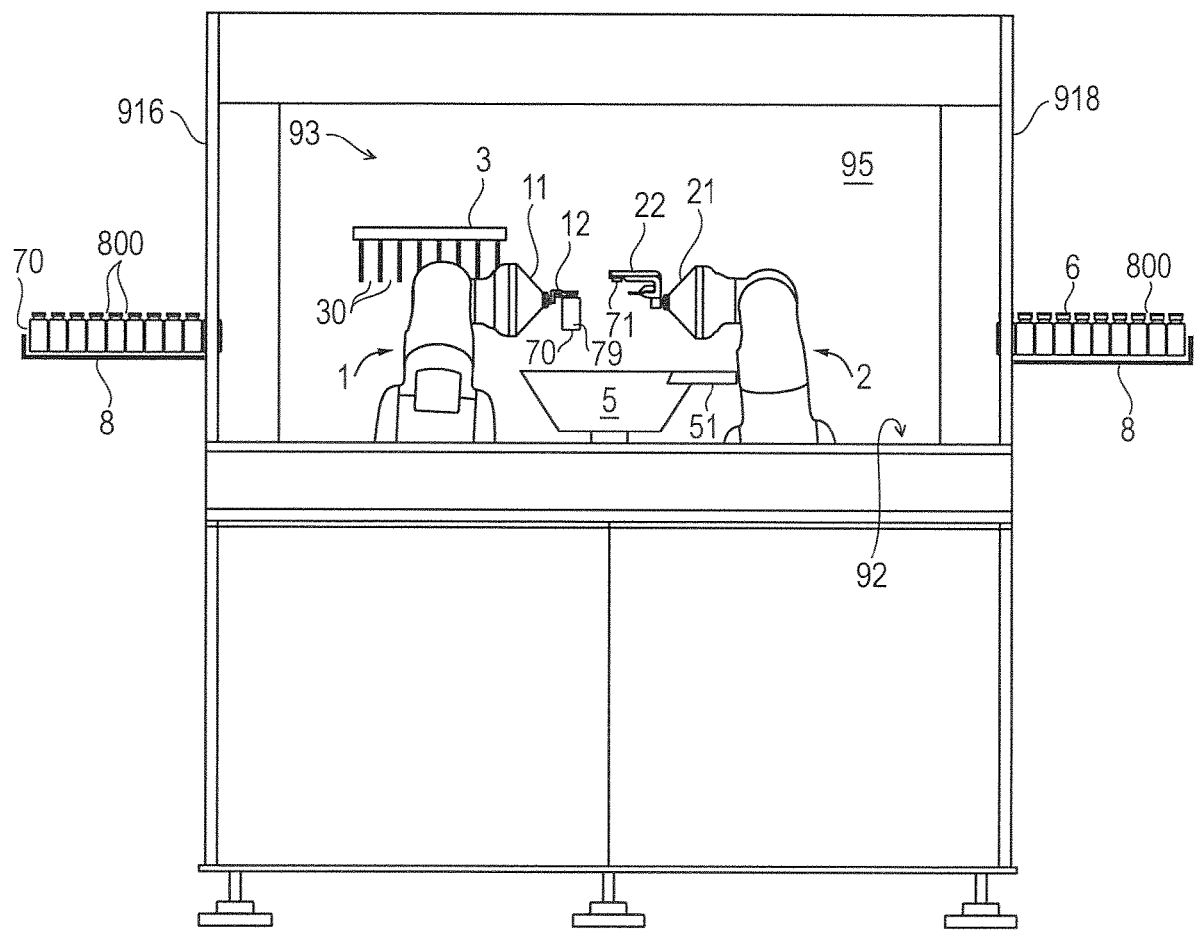
Figure 7C:
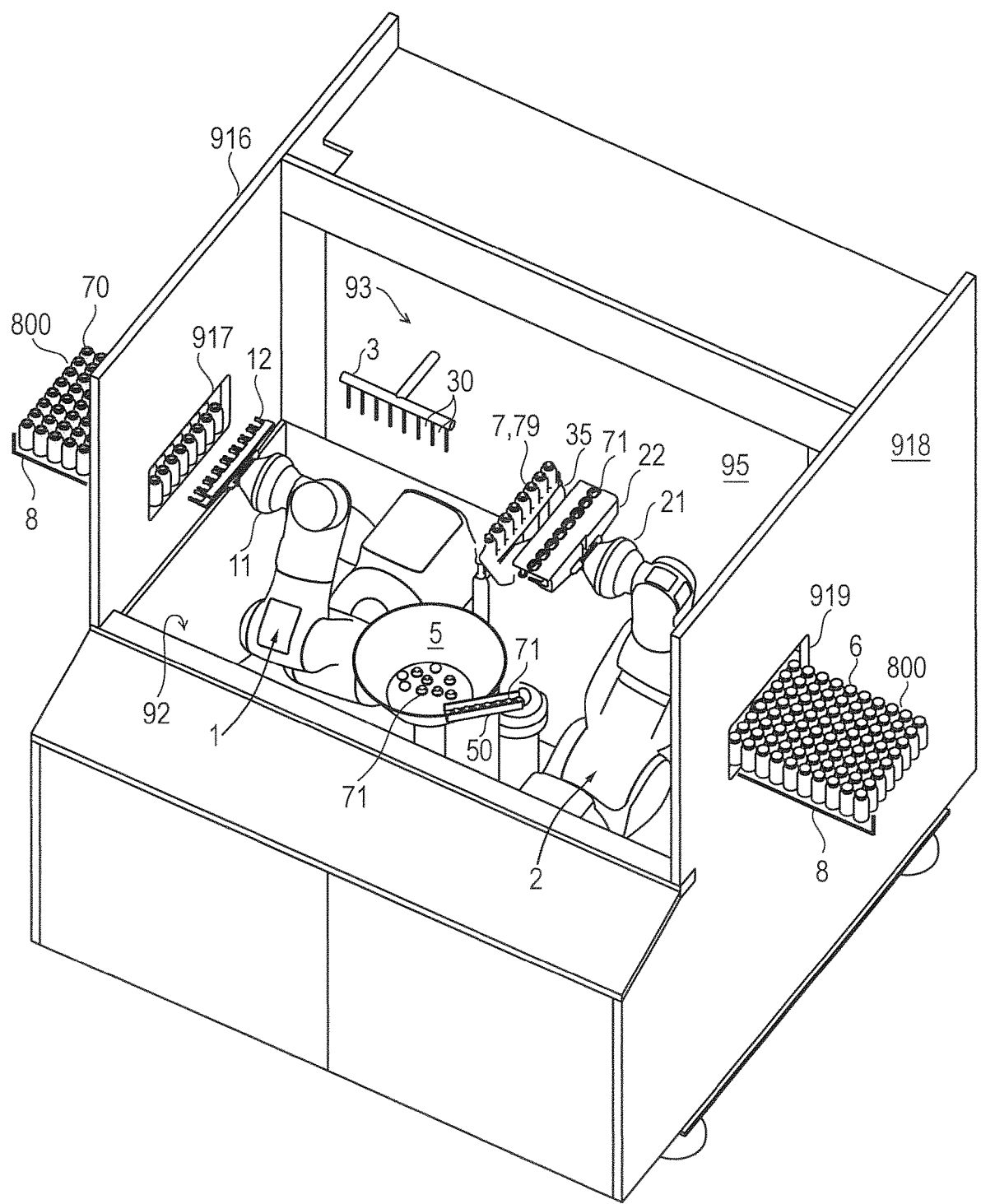
Figure 7D:
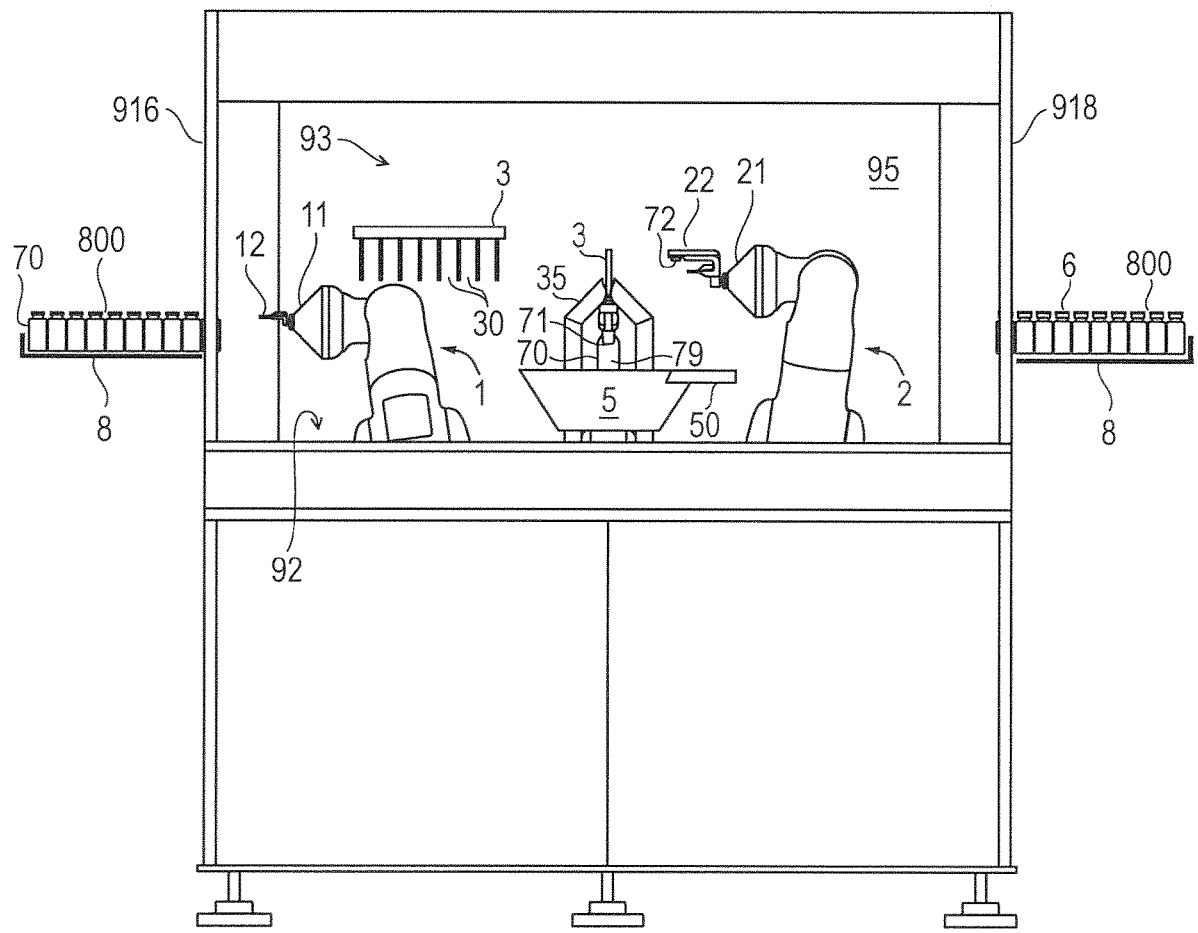
Figure 7E:
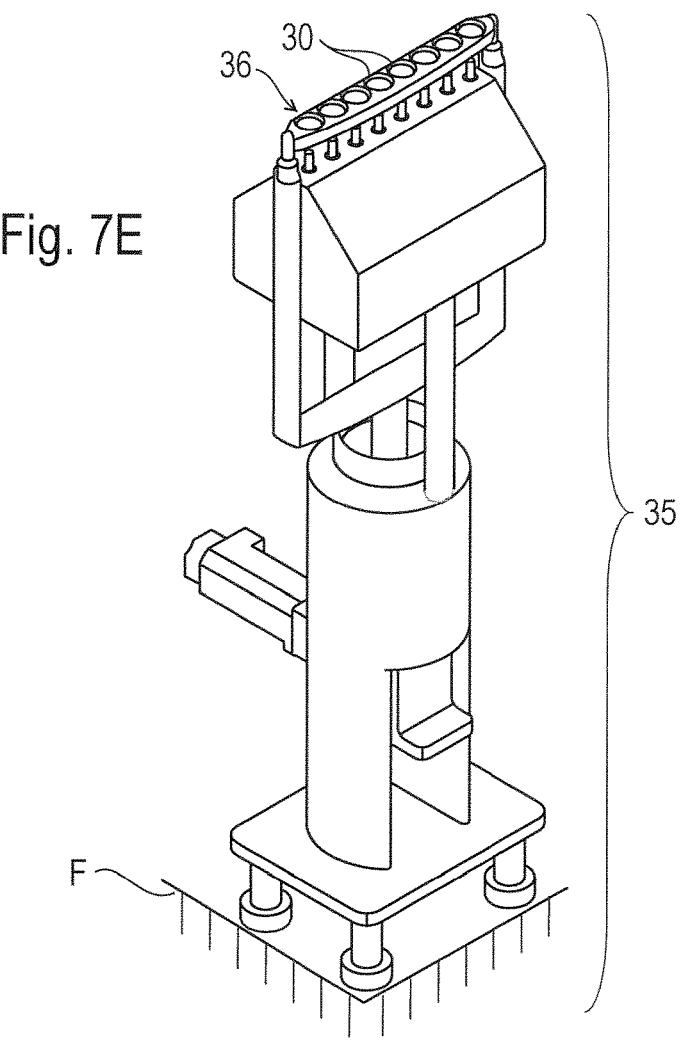

In the drawings shows:
FIG. 1A—a side view of a containment means, for example in the form of an isolator, only as a housing in vertical section;
FIG. 1B—a front perspective view of the containment means according to FIG. 1A, equipped with robots, process units, an exchange module, a lock device, through-openings, and receptacles made available in a tray;
FIG. 1C—the arrangement according to FIG. 1B in a front view;
FIG. 1D—the vertical section on the line A-A in FIG. 1C;
FIG. 1E—the vertical section on the line B-B in FIG. 1D;
FIG. 2A—a front perspective view of the arrangement according to FIG. 1B without the lock device, with both robots in the operating mode (washing and drying);
FIG. 2B—the arrangement according to FIG. 2A in a front view;
FIG. 2C—the vertical section on the line C-C in FIG. 2B;
FIG. 2D—the vertical section on the line D-D in FIG. 2C;
FIG. 3A—a front view of a complete article;
FIG. 3B—the vertical section on the line E-E in FIG. 3A;
FIG. 3C—the complete article according to FIG. 3A in an exploded perspective view;
FIG. 3D—the vertical section on the line F-F in FIG. 3C;
FIG. 4A—a schematic perspective view of the interaction of two robots in the transfer/acceptance of articles or article parts;
FIG. 4B—the assembly according to FIG. 4A in a perspective plan view;

FIG. 4C—the first robot from FIG. 4A, in a perspective view of the manipulating element;

FIG. 4D—an enlarged perspective view of the manipulating element of the first robot from FIG. 4A with receptacles, in the form of vials, gripped at the necks;

FIG. 5—a perspective view of the assembly according to FIG. 2A, with an approaching exchange module;

FIG. 6A—the exchange module according to FIG. 5 in an enlarged perspective view;

FIG. 6B—a perspective view of an alternative exchange module with a process unit in the form of a capping device for applying second closures;

FIG. 7A—a perspective plan view of the containment means according to FIG. 1A, equipped with two robots in the operating mode (filling and plugging), a process unit, a parts magazine with first closures, receptacles made available in the tray at the first through-opening, a tray with closed receptacles at the second through-opening;

FIG. 7B—the assembly according to FIG. 7A in a front view;

FIG. 7C—a perspective plan view of the arrangement according to FIG. 7A, supplemented with a weighing station, with both robots in the operating mode (filling, weighing and plugging);

FIG. 7D—the assembly according to FIG. 7C in a front view;

FIG. 7E—a perspective view of the weighing station from FIG. 7D; and

Figure 8:
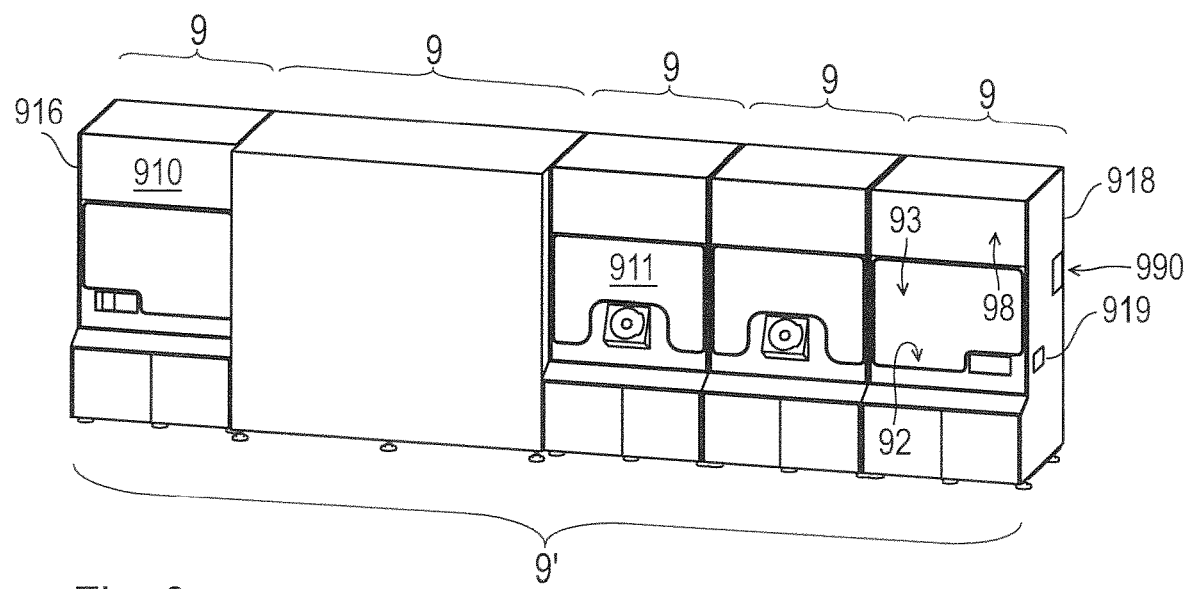

FIG. 8—a containment means chain, with five interlinked containment means for carrying out different production cycles.

ILLUSTRATIVE EMBODIMENT

The constructive assembly of a containment means according to the invention, intended for the automated production of pharmaceutical or biotechnical articles, is described in detail below with reference to the appended drawings.

The following stipulation applies to the entirety of the rest of the description. Where reference numbers appear in a figure in order to avoid ambiguity, but are not explained in the directly associated text of the description, their mention in a preceding description of a figure is incorporated by reference. In the interests of clarity, component parts are generally not designated again in subsequent figures, provided that it is unambiguously clear from the drawing that these are "recurring" component parts.

FIG. 1A

The containment means 9, here in the form of an isolator, is first of all shown only in a substantially empty assembly with the housing 90 in order to explain the spatial division and walls. A transparent pane 911 usually sits in the front wall 910, while an exchange module 95 is inserted into the rear wall 912. The housing 90 moreover comprises an upper wall and a lower wall which, together with the front wall 910 and rear wall 912, delimit the containment means 9 from the outside. Inside the containment means 9 is the inner chamber 91, which is constructed as a process space 93 and, beneath the latter, as a tub-shaped base space 92 which, at the bottom, terminates at a beveled bottom face 914, beneath which the bottom space 97 is located. Process space 93 and base space 92 adjoin each other in an open and congruent manner. At its lowest point, the bottom face 914 has a water removal opening 920, adjacent to which an outflow air filter 940 is inserted into the rear wall 912 and protrudes into the rear space 99. The tunnel 990 extends through the rear space 99. Extending inside the process space 93 is a vertical working range a, which is defined between a minimum working height $a_{min}$ and a maximum working height $a_{max}$. At the top, the chamber 91 and process space 93 terminate at a ceiling face 915, on which there is installed an inflow air filter 94 that protrudes into the roof space 98. During the operation of the containment means 9, a typical laminar airflow L is introduced from above through the inflow air filter 94 into the chamber 91, which airflow L flows out of the chamber 91 at the bottom via the outflow air filter 940.

FIGS. 1B to 1E

This sequence of figures illustrates the containment means 9 equipped with two robots 1,2, two process units 3, an exchange module 95, a lock device 96, the input-side through-opening 917 and the output-side through-opening 919. Receptacles 70 made available in a sorting grid 800 in a tray 8 are brought to the through-opening 917 at the input side. There is nothing present at this moment at the through-opening 919 at the output side. On the side of the exchange module 95 directed toward the process space 93, the process units 3 are installed, e.g. in a cascade formation, and washing and drying nozzles are arranged in a pick-up grid 30. Collecting basins 39 for collecting washing liquid are arranged under the process units 3. The lock device 96 (see FIGS. 1B,1C) integrated in the exchange module 95 is located between the two process units 3.

The feet 10,20 of the robots 1,2 are anchored to the rear wall 912 in the base space 92; the robot arms 11,21, with the manipulating elements 12,22 arranged at the very front (see also FIGS. 2C and 2D), protrude upward into the process space 93. In order to form a modular system of containment means 9, a predefined positioning grid is provided for anchoring the feet 10, 20 of the robots 1,2 to the side faces 910,912,916,918 inside the base space 92 of the respective containment means 9. The manipulating element 12,22 has the function of gripping and transporting means for the articles 6 or article parts 7;70-72 and/or of inspecting the articles 6 or article parts 7;70-72 and/or producing the articles 6 (see also FIG. 2A). Moreover, in addition to the purely gripping or holding function, the manipulating element 12,22 could also be equipped with an assembly or disassembly device, an inspection device and/or a closing device and/or an identification device. In addition or alternatively to the lock device 96, the exchange module 95 can support a transfer station 4, which has the pick-up grid 40 (see FIG. 1E).

The pivot range $(R_1,R_2)$ of the manipulating elements 12,22 on the robot arms 1, 2 extends in a horizontal plane and a vertical plane, namely in a vertical plane within a working range a having the minimum working height and maximum work heighting $a_{min}$, $a_{max}$ (see FIG. 1A). In the horizontal plane, the pivot range $(R_1,R_2)$ is preferably sufficiently dimensioned across the side faces 916,918 in order to be able to grasp the receptacles 70 standing systematically in the sorting grid 800 in the tray 8 at the input-side through-opening 917 and, after treatment of the receptacles 70, to position them in the output-side through-opening 919. Within the pivot range $(R_1,R_2)$, at least one transfer region is provided which is intended, by means of the manipulating element 12,22 of at least one robot 1,2, for picking up or positioning articles 6 or article parts 7;70-72. In a further embodiment, two transfer regions are provided within the pivot range $(R_1,R_2)$. In this case, the first transfer region is intended for picking up articles 6 or article parts 7;70-72 by means of the manipulating element 12,22 of at least one robot 1, 2. By contrast, the second transfer region would be provided for positioning so articles 6 or article parts 7;703-

72 by means of the manipulating element 12,22 of at least one robot 1,2 (see also FIGS. 2A and 3A-3C).

Extending through the individual containment means 9 and the containment means chain 9' is the tunnel 990, which serves to ensure that the trays 8 emptied of receptacles 70 at the input-side through-opening 917 bypass the chamber 91 and are made available again at the second through-opening 919 in order to receive the finished produced articles 6 and are brought back in the opposite direction to the input-side through-opening 917 after emptying (see also FIG. 8).

FIGS. 2A to 2D

This sequence of figures illustrates the containment means 9 with both robots 1,2 in the operating mode. The arm 11 of the first robot 1 pivots toward the input-side through-opening 917 in order, by means of the associated manipulating element 12, to pick up a grouped number of empty and open receptacles 70 (e.g. the very front row of receptacles 70) from the tray 8 standing there, which tray 8 is loaded with the receptacles 70 in the sorting grid 800, and to deliver them to the adjacent process unit 3. This process unit 3 could be a first washing station. In an interim step, the first robot 1 had placed the group of receptacles 70 previously washed at the washing station onto the transfer station 4 in the pick-up grid 40 thereof. The group standing on the transfer station, serving as transfer region, is grasped by the manipulating element 22 of the second robot 1 and delivered firstly to the associated process unit 3, which could be a second washing station. After the second cleaning procedure, the second robot 2 transports the now twice cleaned group of receptacles onto the tray 8 standing at the output-side through-opening 919 in the sorting grid 800 for further processing, usually inside a plurality of containment means 9 linked to one another in a production line to form a containment means chain 9'.

FIGS. 3A to 3D

A finished produced article 6 comprises, as article parts 7, firstly a receptacle 70, here in the form of a typical vial, which has a filling opening 73 for introducing a pharmaceutical or biotechnical filling 79 as liquid or powder into the receptacle 70. Moreover, the complete article 6 has a first closure 71, here in the form of a stopper. A stopper could also be produced by thermal means. Finally, the complete article 6 can comprise an optional second closure 72, namely in the form of an element, e.g. a crimped cap, which engages over the first closure 71 with a form fit and secures the first closure 71.

FIGS. 4A to 4D

This sequence of figures illustrates the interaction of two robots 1,2 and their manipulating elements 12,22 in the transfer/acceptance, taking the example of a grouped number of receptacles 70 which are delivered and still held by the manipulating element 12 of the first robot 1 at a spatially floating transfer region and are now gripped by the manipulating element 22 of the second robot 2 for acceptance. For example, the manipulating element 12 of the first robot 1 holds a group of receptacles 70 suspended by their vial necks in accordance with pick-up grid 120. The group of receptacles 70 is accepted by being grasped by the manipulating element 222 of the second robot according to pick-up grid 220 and held like tongs between their bottoms and upper ends. Then, by movement of the arm 21 of the second robot 2, the group of receptacles 70 thus gripped is as it were lifted out of the pick-up grid 120 from the manipulating element 12 of the first robot 1 and transported onward.

The sorting grid 800 in the trays 8, the pick-up grid 30 of the process units 3 and the pick-up grid 40 of the transfer station 4 are not always compatible from the outset with the pick-up grids 120,220 of the manipulating elements 12,22. To establish compatibility, the pick-up grids 120,220 of the manipulating elements 12, 22 are designed to be adjustable by means of an adjustment mechanism.

FIGS. 5 and 6A

A replaceable exchange module 95 is insertable into one of the housing faces 910,912,916,918 delimiting the process space 3, here preferably into a recess 913 of the rear wall 912. In the example shown, two cascade-shaped process units 3 with their pick-up grids 30 are provided alongside each other. A collecting basin 39 is arranged under each of them. Both process units 3 could be washing stations; the right-hand one could also be configured as a drying station. A transfer station 4 with the pick-up grid 40 is installed between the two process units 3. This replaceability of the exchange module 95, with the possibility of being equipped in a function-specific manner with process units 3, permits modular and thus production-efficient assembly of individual containment means 9, and also of a plurality of containment means 9 linked to one another to form a containment means chain 9'.

In addition to the process units 3, the exchange module 95 can have a lock device 96 for the loading and/or unloading of article parts 7 or articles 6 (see FIG. 1A). The individual process unit 3 can be configured as a washing station, drying station, sterilizing station, filling station, closing station, assembly or disassembly station, identification station or test station. A test station is set up for optical inspection and/or weight control.

FIG. 6B

On this exchange module 95, a process unit 3 is installed in the form of a capping device with its pick-up grid 30 for applying the second closures 762 over the previously applied first closures 71. The second closures 72 serve to secure the first closure 71 and engage over the latter in the manner of a crimped cap.

FIGS. 7A and 7B

This sequence of figures illustrates the production steps by which receptacles 70 in a containment means 9 are filled and subsequently closed. The empty receptacles 70 made available in the tray 8 according to sorting grid 800 are located at the input-side through-opening 917. The two robots 1,2, running in the operating mode, are once again present in the chamber 91. A process unit 3 with its pick-up grid 30 is installed as a filling station on the exchange module 95. It is assumed that the receptacles 70 provided with the filling 79 at the process unit 3 and suspended in the associated manipulating element 12 have been transported by the first robot 1 to a floating transfer region, which the second robot 2 approaches with its manipulating element 22. First closures 71, e.g. stoppers, are gripped in this manipulating element 22 according to the pick-up grid 220, in order to close the filled receptacles 70 in a subsequent production step.

The closures 71 are made available from a storage means 5 which is present in the process space 93 and in which the closures 71 are stored. The storage means 5 is assigned a magazine 50 for filling the manipulating element 22 with a grouped number of closures 71 according to its pick-up grid 220. The storage means 5 is provided with a vibration device for filling the magazine 50. Preferably, the storage means 5 is supported outside the chamber 91 in order to avoid interference vibrations.

After the first closures 71 have been placed on the filled receptacles 70, in a simple case the articles 6 could be regarded as finished and would be delivered as such from the second robot 2 to the output-side through-opening 919 and onto the tray 8 standing there, in the sorting grid 800.

FIGS. 7C to 7E

Before the filled receptacles 70 are closed, a check to verify the correct filling quantity is often made by means of a process unit 3 in the form of a weighing station 35 which is configured to individually measure the weight of each of the filled receptacles 70 and is preferably supported outside the chamber 91, or directly outside the containment means 9, on a foundation F and is thus insulated from shocks. The weighing station 35 has a weighing tray 36 with a pickup grid 30, which should be compatible with the other pick-up grids 120,220;30,40.

FIG. 8

The containment means chain 9' shown by way of example consists of five interconnected containment means 9 for carrying out different production steps, beginning with the making available of empty receptacles 70 at the input-side through-opening 917, through to the ejection of the finished articles 6 at the output-side through-opening 919. Between these lie the cleaning of the containers 70, the introduction of the filling 79, the weight control, and the application of the first closures 71 and, if appropriate, also the second closures 72.

The base space 92 and the process space 93 of the individual containment means 9 are each equipped, in a task-specific manner, with robots 1,2 having manipulating elements 12,22 and/or with process units 3 and/or transfer stations 4 and/or storage means 5.

The first containment means 9 has the first through-opening 917 via which article parts 7 in the form of receptacles 70, arranged in a tray 8 systematically according to a sorting grid 800, are delivered to the process space 93. In this way, a grouped number of the receptacles 70 can be grasped by the manipulating element 12 of the first robot 1 and brought to the first process unit 3 for carrying out the first production step. The first containment means 9 moreover has a second through-opening 919 or is open toward a next containment means 9 for the purpose of transferring the processed article parts 7 into the process space 93 of the next containment means 9 in order to carry out subsequent production steps by means of further robots 2 and further process units 3. The final containment means 9 of the containment means chain 9', with the final robots 2 and final process units 3 installed therein, is intended for carrying out final production steps. This final containment means 9 has the second through-opening 919 through which the finished produced articles 6 can be output and positioned on a tray 8.

After the trays 8 have been emptied of the finished produced articles 6, the trays 8 can be returned through the tunnel 990 to the starting position at the first through-opening 917 on the first containment means 9 for the subsequent delivery of receptacles 80 set up systematically according to the pick-up grid 800.

The invention claimed is:

1. A constructive assembly of a containment means (9), intended for the automated production of pharmaceutical or biotechnical articles (6), wherein:
   a) an article (6), as end product, in each case comprises a plurality of article parts (7);
   b) the containment means (9) is surrounded by a housing (90) within which there is an inner chamber (91) having at least one through-opening (917,919);
   c) at least one robot (1,2) is installed in the chamber (91), which robot (1,2) has at least one manipulating element (12,22) on its a pivotable arm (11,21), which can move within a pivot range ($R_1, R_2$), and
   d) the chamber (91) is suitable for the installation of at least one process unit (3) for the production of the articles (6), characterized in that
   e) the chamber (91) comprises:
      ea) a process space (93) for the production of the articles (6); and
      eb) a tub-shaped base space (92) for anchoring a foot (10,20) of the at least one robot (1,2) to a side face (910,912,916,918) inside the base space (92); wherein
      ec) the process space (93) is arranged above the base space (92) and both adjoin each other in a congruent and open manner;
   f) the at least one manipulating element (12,22) has the following functions:
      fa) gripping means and transporting means for the articles (6) or article parts (7); and/or
      fb) inspection of the articles (6) or article parts (7); and/or
      fc) production of the articles (6); and
   g) the pivot range ($R_1, R_2$) of the at least one manipulating element (12,22) on the at least one robot (1,2) extends in a horizontal and vertical plane, the vertical plane within a working region (a), the working region defined between a minimum working height ($a_{min}$) and a maximum working height ($a_{max}$).

2. The constructive assembly as claimed in claim 1, characterized in that, within the pivot range ($R_1, R_2$), at least one transfer region is provided which is intended to pick up or position articles (6) or article parts (7;70-72) by means of the at least one manipulating element (12,22) of the at least one robot (1,2).

3. The constructive assembly as claimed in claim 1, characterized in that first and second transfer regions are provided within the pivot range ($R_1, R_2$); wherein:
   a) the first transfer region is intended for picking up articles (6) or article parts (7;70-72) by means of the at least one manipulating element (12,22) of the at least one robot (1,2); and
   b) the second transfer region is intended for positioning articles (6) or article parts (7;70-72) by means of the at least one manipulating element (12,22) of the at least one robot (1,2).

4. The constructive assembly as claimed in claim 3, characterized in that
   a) the containment means (9) is connected to a second containment means (9), in each of which at least one robot (1,2) is installed;
   b) the at least one robot of the containment means and the at least one robot of the second containment means each including at least one manipulating element which can move within a pivot range; and
   c) one of the transfer regions lies in the pivot ranges ($R_1, R_2$) of the at least one manipulating elements (12,22) of both robots (1,2).

5. The constructive assembly as claimed in claim 4, characterized in that, in order to form a modular system of containment means (9), a predefined positioning grid is provided for anchoring the foot (10,20) of the at least one robot (1,2) to the side faces (910,912,916,918) inside the base space (92) of the respective containment means (9).

6. The constructive assembly as claimed in claim 3, characterized in that
   a) at least two robots (1,2) are installed in the containment means (9); and b) a transfer region lies in each case in the pivot range ($R_1, R_2$) of the at least one manipulating elements (12,22) of two adjacent robots (1,2).

7. The constructive assembly as claimed in claim 1, characterized in that the at least one process unit (3) for production of the articles (6) is installed in the process space (93) of the containment means (9) in the pivot range ($R_1, R_2$) of the at least one manipulating element (12,22) of the at least one robot (1,2).

8. The constructive assembly as claimed in claim 7, characterized in that
   a) the at least one process unit (3) is configured as a washing station, drying station, sterilizing station, filling station, closing station, assembly or disassembly station, identification station or test station; wherein
   b) the test station is set up for optical inspection and/or weight control; and
   c) a plurality of process units (3) with various functions can be installed in the process space (93).

9. The constructive assembly as claimed in claim 1, characterized in that the base space (92) is delimited by an inclined bottom face (914) which promotes the removal of an airflow (L), of a laminar nature, flowing through the chamber (91) and of liquids that arise in the process space (93) during the production of the articles (6).

10. The constructive assembly as claimed in claim 1, characterized in that the following are moreover arranged in the process space (93):
    a) at least one transfer station (4) for interim positioning of article parts (7) and/or articles (6); and/or
    b) at least one storage means (5) for storing article parts (7); wherein
    c) the at least one manipulating elements (12,22) have a pick-up grid (120,220) for picking up a grouped number of article parts (7) or articles (6); and
    d) the storage means (5) can be assigned a magazine (50) for filling the at least one manipulating element (12,22), according to its pick-up grid (120,220), with a grouped number of article parts (7).

11. The constructive assembly as claimed in claim 10, characterized in that
    a) a respective pick-up grid (30,40) of the process units (3) and the at least one transfer station (4) is configured to simultaneously handle a grouped number of article parts (7) or articles (6) in a manner numerically and geometrically matching the pick-up grid (120,220) of the at least one manipulating elements (12,22); and
    b) the at least one manipulating element (12,22) can additionally be equipped with an assembly or disassembly device, an inspection device and/or a closing device and/or an identification device.

12. The constructive assembly as claimed in claim 1, characterized in that
    a) a replaceable exchange module (95), which is equipped with function-specific process units (3), is insertable into a housing face (910,912,916,918) delimiting the process space (93);
    b) the exchange module (95) can have, in addition to the process units (3), a lock device (96) for loading/unloading article parts (7) or articles (6); and
    c) functionally identical process units (3) can be arranged in mutually staggered cascades.

13. The constructive assembly as claimed in claim 1, characterized in that
    a) the containment means (9) is linked to a further containment means (9) in a production line to form a containment means chain (9'); wherein
    b) a respective base space (92) of the further containment means and a respective process space (93) of the further containment means can be equipped in a task-specific manner with robots (1,2), manipulating elements (12, 22) and/or process units (3) and/or transfer stations (4) and/or storage means (5).

14. The constructive assembly as claimed in claim 13, characterized in that
    a) the first containment means (9) has a first through-opening (917) via which article parts (7), in the form of receptacles (70) placed in a tray (8) systematically according to a sorting grid (800), are delivered to the process space (93), and thus a grouped number of the receptacles (70) can be gripped by the at least one manipulating element (12) of the at least one robot (1) and brought to the at least one process unit (3) in order to carry out the first production step;
    b) the first containment means (9) has a second through-opening (919) or is open toward the further containment means (9) for the purpose of transferring the article parts (7), processed thus far, into the process space (93) of the further containment means (9) in order to carry out subsequent production steps by means of further robots (2) and further process units (3);
    c) a final containment means (9) of the containment means chain (9'), with final robots (2) and final process units (3) installed therein, is intended for carrying out final production steps; and
    d) the final containment means (9) has a second through-opening (919) through which the finished produced articles (6) can be output.

15. The constructive assembly as claimed in claim 14, characterized in that a pick-up grid (120,220) of the manipulating elements (12,22) is designed to be adjustable by an adjustment mechanism, in order to establish compatibility if the sorting grid (800) initially deviates from pick-up grids (30,40) of the process units (3) and transfer station (4).

16. The constructive assembly as claimed in claim 1, characterized in that the pivot range ($R_1, R_2$) of the at least one manipulating element (12,22) on the at least one robot (1,2) extends in a horizontal plane at least beyond a vertical face (910,912,916,918) of the process space (93).

17. The constructive assembly as claimed in claim 1, characterized in that a finished produced article (6) comprises as article parts (7):
    a) a receptacle (70);
    b) a pharmaceutical or biotechnical filling (79) as liquid or powder introduced into the receptacle (70) through a filling opening (73) of the receptacle;
    c) a first closure (71) in the form of a stopper or of a thermally produced closure; and
    d) an optional second closure (72) in the form of an element engaging with a form fit over the first closure (71) and serving to secure the first closure (71).

18. The constructive assembly as claimed in claim 17, characterized in that
    a) the at least one process unit (3) has the form of a weighing station (35) which is supported on a foundation (F) outside the chamber (91) or directly outside the containment means (9) and is thus insulated from shocks;
    b) the weighing station (35) has a weighing tray (36) with a pick-up grid (30) which is compatible with other pick-up grids (120,220;30,40) and which is intended:

ba) for the insertion of a grouped number of receptacles (70) provided with the filling (79) and deposited by the at least one manipulating element (12,22); and bb) for individual weight measurement of each one of the filled receptacles (70); and c) a storage means (5) is provided with a vibration device for the purpose of filling a magazine (50); wherein d) the storage means (5) is supported outside the chamber (91) in order to avoid interference vibrations.

19. The constructive assembly as claimed in claim 17, characterized in that a) a tunnel (990) extends through an individual containment means (9) and a containment means chain (9'); and b) the tunnel (990) serves to ensure that trays (8) emptied of receptacles (70) at a first through-opening (917) bypass the chamber (91) and are made available again at a second through-opening (919) in order to pick up the finished produced articles (6).

20. The constructive assembly as claimed in claim 17, wherein the optional second closure is a crimped cap.

21. The constructive assembly as claimed in claim 1, characterized in that the containment means (9) is configured as:

a) an open or closed restricted access barrier system (RABS) with an air treatment device of clean-room classification; or b) an isolator with an air treatment device of clean-room classification and a decontamination device; wherein c) the air treatment device has an inflow air filter (94), which is arranged above the process space (93), and an outflow air filter (940), which is installed in a seat present at the base space (92).

* * * * *